United States Patent
Hikosaka

(10) Patent No.: US 8,989,436 B2
(45) Date of Patent: Mar. 24, 2015

(54) IMAGE PROCESSING METHOD, COMPUTER-READABLE STORAGE MEDIUM, IMAGE PROCESSING APPARATUS, AND IMAGING APPARATUS

(75) Inventor: Kentaro Hikosaka, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 877 days.

(21) Appl. No.: 13/073,372

(22) Filed: Mar. 28, 2011

(65) Prior Publication Data

US 2011/0242352 A1    Oct. 6, 2011

(30) Foreign Application Priority Data

Mar. 30, 2010 (JP) ................................. 2010-077996
Dec. 20, 2010 (JP) ................................. 2010-283183
Dec. 20, 2010 (JP) ................................. 2010-283188

(51) Int. Cl.
*G06K 9/00* (2006.01)
*H04N 9/04* (2006.01)
*H04N 5/357* (2011.01)

(52) U.S. Cl.
CPC ............. *H04N 9/045* (2013.01); *H04N 5/3572* (2013.01)
USPC ........................................................ 382/103

(58) Field of Classification Search
None
See application file for complete search history.

(56) References Cited

U.S. PATENT DOCUMENTS

| | | | | |
|---|---|---|---|---|
| 2005/0093992 A1* | 5/2005 | Fukumoto | ................... | 348/222.1 |
| 2006/0238832 A1* | 10/2006 | Ohsawa | ......................... | 358/518 |
| 2008/0137947 A1* | 6/2008 | Sawada et al. | ................ | 382/167 |
| 2009/0273690 A1* | 11/2009 | Nashizawa | .................... | 348/242 |
| 2010/0246967 A1* | 9/2010 | Ando et al. | ................... | 382/190 |

FOREIGN PATENT DOCUMENTS

| | | | |
|---|---|---|---|
| JP | 2005167485 A | * | 6/2005 |
| JP | B2-4250513 | | 4/2009 |
| JP | A-2010-068465 | | 3/2010 |

OTHER PUBLICATIONS

Japanese Office Action issued in Application No. 2010-283183; Dated Jan. 15, 2013 (With Translation).

* cited by examiner

*Primary Examiner* — Stephen R Koziol
*Assistant Examiner* — Delomia Gilliard
(74) *Attorney, Agent, or Firm* — Oliff plc

(57) ABSTRACT

Information of a flare component is extracted from a shot image without using shooting condition data such as wavelength spectrum data of a bright point and imaging characteristic data of a shooting optical system. To achieve this, an aspect of an image processing method of the present application includes an input step inputting a processing target image obtained by a shooting optical system, an estimating step estimating an ideal bright point image component included in an occurrence area of a flare in the processing target image, an extracting step extracting a real bright point image component including a flare component from the occurrence area, and a calculating step calculating a difference between the ideal bright point image component and the real bright point image component as an index of the flare component included in the occurrence area.

11 Claims, 28 Drawing Sheets

Fig. 11A $W_{ijR}$
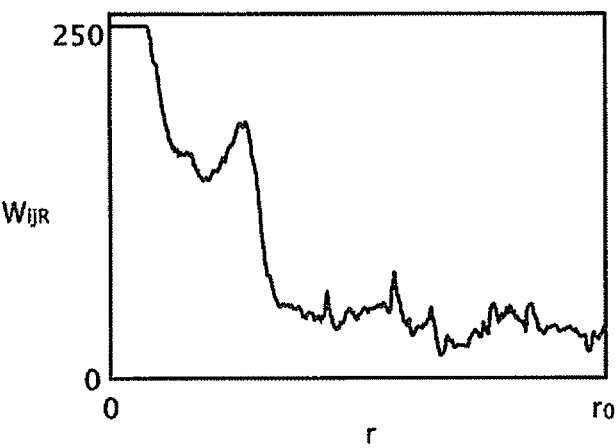
⇩ SMOOTHING
Fig. 11B $W_{ijR}'$
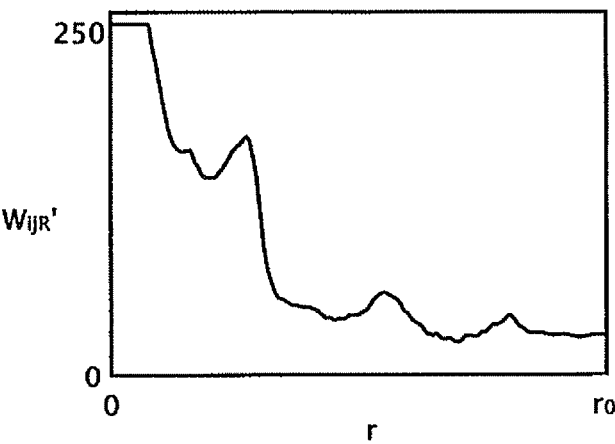

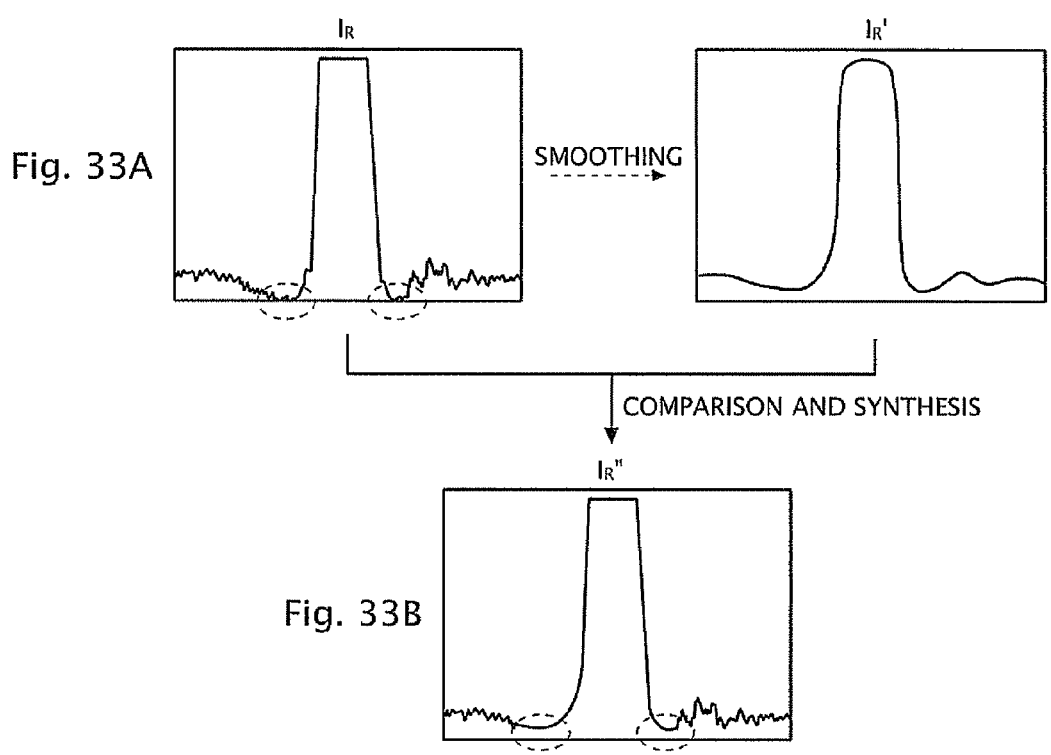

IMAGE PROCESSING METHOD, COMPUTER-READABLE STORAGE MEDIUM, IMAGE PROCESSING APPARATUS, AND IMAGING APPARATUS

CROSS-REFERENCE TO RELATED APPLICATIONS

This application is based upon and claims the benefit of priority from Japanese Patent Application No. 2010-077996 (filed on Mar. 30, 2010), Japanese Patent Application No. 2010-283183 (filed on Dec. 20, 2010), and Japanese Patent Application No. 2010-283188 (filed on Dec. 20, 2010), the entire contents of which are incorporated herein by reference.

BACKGROUND

1. Field

The present application relates to an image processing method, a computer-readable storage medium, an image processing apparatus, and an imaging apparatus extracting information of a flare from a shot image.

2. Description of the Related Art

When shooting is performed by a shooting optical system having a DOE (Diffractive Optical Element), if a quite highly luminous object (bright point) exists in a shooting angle of view, a flare (color flare) with color blurring occurs in a periphery of a bright point image on a shot image. This color flare gives an unnatural impression to the shot image, and particularly, it is significantly unnatural compared to an achromatic flare.

Accordingly, Patent Document 1 (Japanese Patent No. 4250513) discloses an electronic camera that previously stores imaging characteristic data of a shooting optical system, estimates a flare component based on the data and a position of bright point on a shot image, and reduces the flare component from the shot image.

However, the flare component actually occurred in the shot image depends not only on the imaging characteristic of the shooting optical system but also on a wavelength spectrum included in the bright point, so that it is difficult for the electronic camera described in Patent Document 1 to estimate the flare component with a sufficient accuracy.

Further, even if it is tried to execute a flare reduction method described in Patent Document 1 using software of a computer, since data sufficient for estimating the flare component is not given to a normal shot image (JPEG image, for example), the execution of the method is not possible.

SUMMARY

Accordingly, the present application provides an image processing method, a computer-readable storage medium, an image processing apparatus, and an imaging apparatus capable of extracting, from a shot image, information of a flare component (flare color component being a colored distribution of a color flare, for example) without using shooting condition data such as wavelength spectrum data of a bright point and imaging characteristic data of a shooting optical system.

Further, the present application provides an image processing method, a computer-readable storage medium, an image processing apparatus, and an imaging apparatus capable of accurately extracting an influence of the color flare from an occurrence area of a color flare in a shot image.

An aspect of an image processing method of the present application includes an input step inputting a processing target image obtained by a shooting optical system, an estimating step estimating an ideal bright point image component included in an occurrence area of a flare in the processing target image, an extracting step extracting a real bright point image component including a flare component from the occurrence area; and a calculating step calculating a difference between the ideal bright point image component and the real bright point image component as an index of the flare component included in the occurrence area.

Further, an aspect of a computer-readable storage medium of the present application stores an image processing program to cause a computer to execute an input step inputting a processing target image obtained by a shooting optical system, an estimating step estimating an ideal bright point image component included in an occurrence area of a flare in the processing target image, an extracting step extracting a real bright point image component including a flare component from the occurrence area, and a calculating step calculating a difference between the ideal bright point image component and the real bright point image component as an index of the flare component included in the occurrence area.

Further, an aspect of an image processing apparatus of the present application includes an input unit inputting a processing target image obtained by a shooting optical system, an estimating unit estimating an ideal bright point image component included in an occurrence area of a flare in the processing target image, an extracting unit extracting a real bright point image component including a flare component from the occurrence area, and a calculating unit calculating a difference between the ideal bright point image component and the real bright point image component as an index of the flare component included in the occurrence area.

Further, an aspect of an image processing method of the present application includes an input step inputting a color processing target image obtained by a shooting optical system, an area setting step setting a processing area including an occurrence area of a color flare on the processing target image, a reference color setting step setting a reference color component to be a reference among respective color components of the occurrence area, a correlation calculating step calculating correlation information indicating a correlation between a reference color component and a focused color component in the processing area, and a flare color component estimating step estimating a flare color component being a colored distribution of the color flare based on the correlation information of the processing area and the reference color component of the occurrence area.

Further, an aspect of a computer-readable storage medium of the present application stores an image processing program to cause a computer to execute an input step inputting a color processing target image obtained by a shooting optical system, an area setting step setting a processing area including an occurrence area of a color flare on the processing target image, a reference color setting step setting a reference color component to be a reference among respective color components of the occurrence area, a correlation calculating step calculating correlation information indicating a correlation between a reference color component and a focused color component in the processing area, and a flare color component estimating step estimating a flare color component being a colored distribution of the color flare based on the correlation information of the processing area and the reference color component of the occurrence area.

Further, an aspect of an image processing apparatus of the present application includes an input unit inputting a color processing target image obtained by a shooting optical system, an area setting unit setting a processing area including an occurrence area of a color flare on the processing target image, a reference color setting unit setting a reference color component to be a reference among respective color components of the occurrence area, a correlation calculating unit calculating correlation information indicating a correlation between a reference color component and a focused color component in the processing area, and a flare color component estimating unit estimating a flare color component being a colored distribution of the color flare based on the correlation information of the processing area and the reference color component of the occurrence area.

Further, an aspect of an image processing method of the present application includes an input step inputting a color processing target image obtained by a shooting optical system; a discriminating step discriminating whether or not a color correction is performed on an occurrence area of a color flare on the processing target image; a restoring step restoring, when the color correction is performed on the occurrence area, a color distribution of the occurrence area to a state before the color correction; and a flare estimating step estimating an influence given by the color flare to the occurrence area based on the color distribution of the occurrence area being restored.

Further, an aspect of a computer-readable storage medium of the present application stores an image processing program to cause a computer to execute an input step inputting a color processing target image obtained by a shooting optical system; a discriminating step discriminating whether or not a color correction is performed on an occurrence area of a color flare on the processing target image; a restoring step restoring, when the color correction is performed on the occurrence area, a color distribution of the occurrence area to a state before the color correction; and a flare estimating step estimating an influence given by the color flare to the occurrence area based on the color distribution of the occurrence area being restored.

Further, an aspect of an image processing apparatus of the present application includes an input unit inputting a color processing target image obtained by a shooting optical system; a discriminating unit discriminating whether or not a color correction is performed on an occurrence area of a color flare on the processing target image; a restoring unit restoring, when the color correction is performed on the occurrence area, a color distribution of the occurrence area to a state before the color correction; and a flare estimating unit estimating an influence given by the color flare to the occurrence area based on the color distribution of the occurrence area being restored.

Further, an aspect of an imaging apparatus of the present application includes an imaging device capturing an object image formed by a shooting optical system, and one aspect of the image processing apparatus of the present application.

BRIEF DESCRIPTION OF THE DRAWINGS

FIGS. 11A and 11B are views explaining an effect of smoothing.

FIGS. 33A and 33B are schematic diagrams explaining steps of forming a reference image.

DETAILED DESCRIPTION OF THE EMBODIMENTS

First Embodiment

Figure 1:
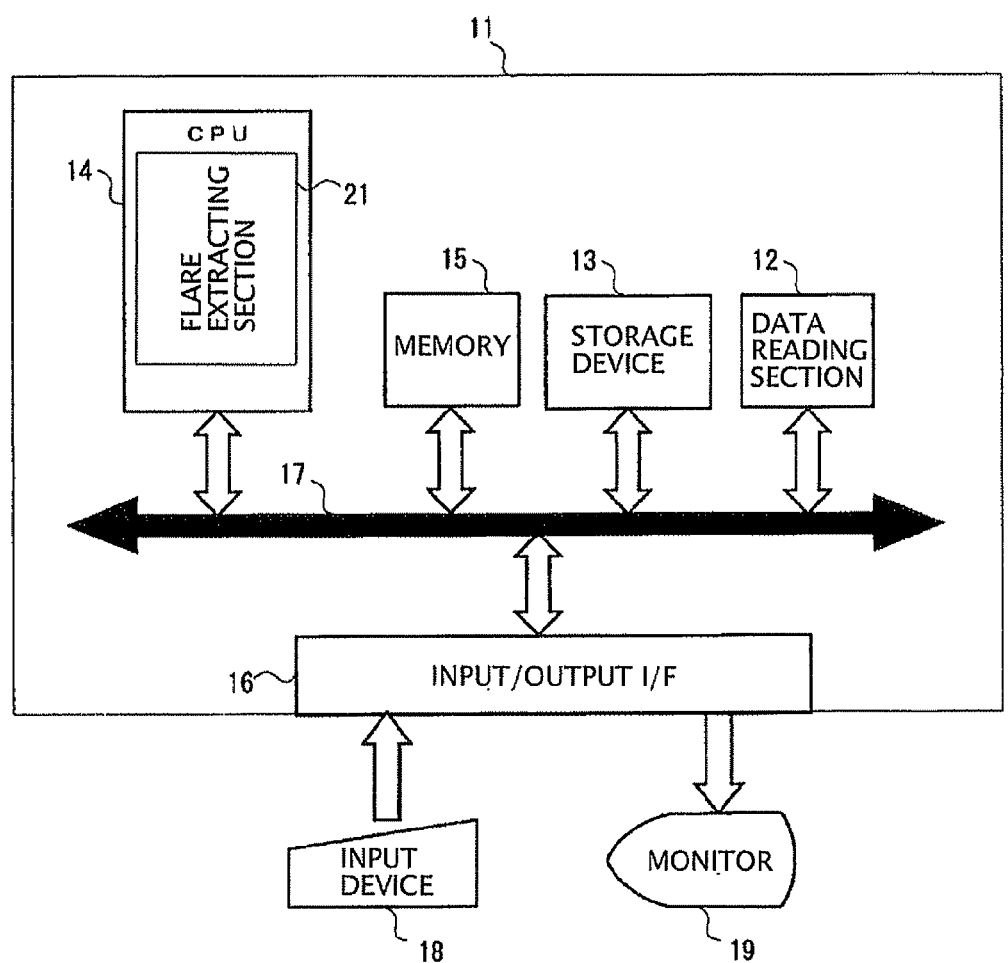
FIG. 1 is a block diagram illustrating a configuration example of an image processing apparatus of a first embodiment.

Hereinafter, a first embodiment of the present application will be described. FIG. 1 is a block diagram illustrating a configuration example of an image processing apparatus of the present embodiment. The image processing apparatus of the present embodiment is formed of a computer 11 in which an image processing program is installed.

The computer 11 illustrated in FIG. 1 includes a data reading section 12, a storage device 13, a CPU 14, a memory 15, an input/output I/F 16, and a bus 17. The data reading section 12, the storage device 13, the CPU 14, the memory 15, and the input/output I/F 16 are mutually connected via the bus 17. Further, an input device 18 (a keyboard, a pointing device or the like) and a monitor 19 are respectively connected to the computer 11 via the input/output I/F 16. Note that the input/output I/F 16 receives respective inputs from the input device 18, and it also outputs data for display to the monitor 19.

The data reading section 12 is used when image data to be an image processing target is read from the outside. For example, the data reading section 12 is formed of a reading device (an optical disk drive, a magnetic disk drive, a magnetic optical disk drive or the like) that obtains image data from a storage medium inserted into the data reading section 12, or a communication device (a USB interface, a LAN module, a wireless LAN module or the like) that communicates with an external device based on a well-known communication protocol.

The storage device 13 is formed of, for example, a storage medium such as a hard disk and a nonvolatile semiconductor memory. An image processing program is recorded in the storage device 13. Note that the storage device 13 can also store the image data read from the data reading section 12.

The CPU 14 is a processor that executes the image processing program stored in the storage device 13 and comprehensively controls respective parts of the computer 11. Here, the image processing program of the present embodiment includes a function of flare reduction processing, and when the flare reduction processing is carried out, the CPU 14 functions not only as a control section controlling the respective parts but also as a flare extracting section 21 (an operation of the flare extracting section 21 will be described later).

The memory 15 temporarily stores respective calculation results obtained by the image processing program. The memory 15 is formed of a volatile SDRAM or the like, for instance.

Figure 2:
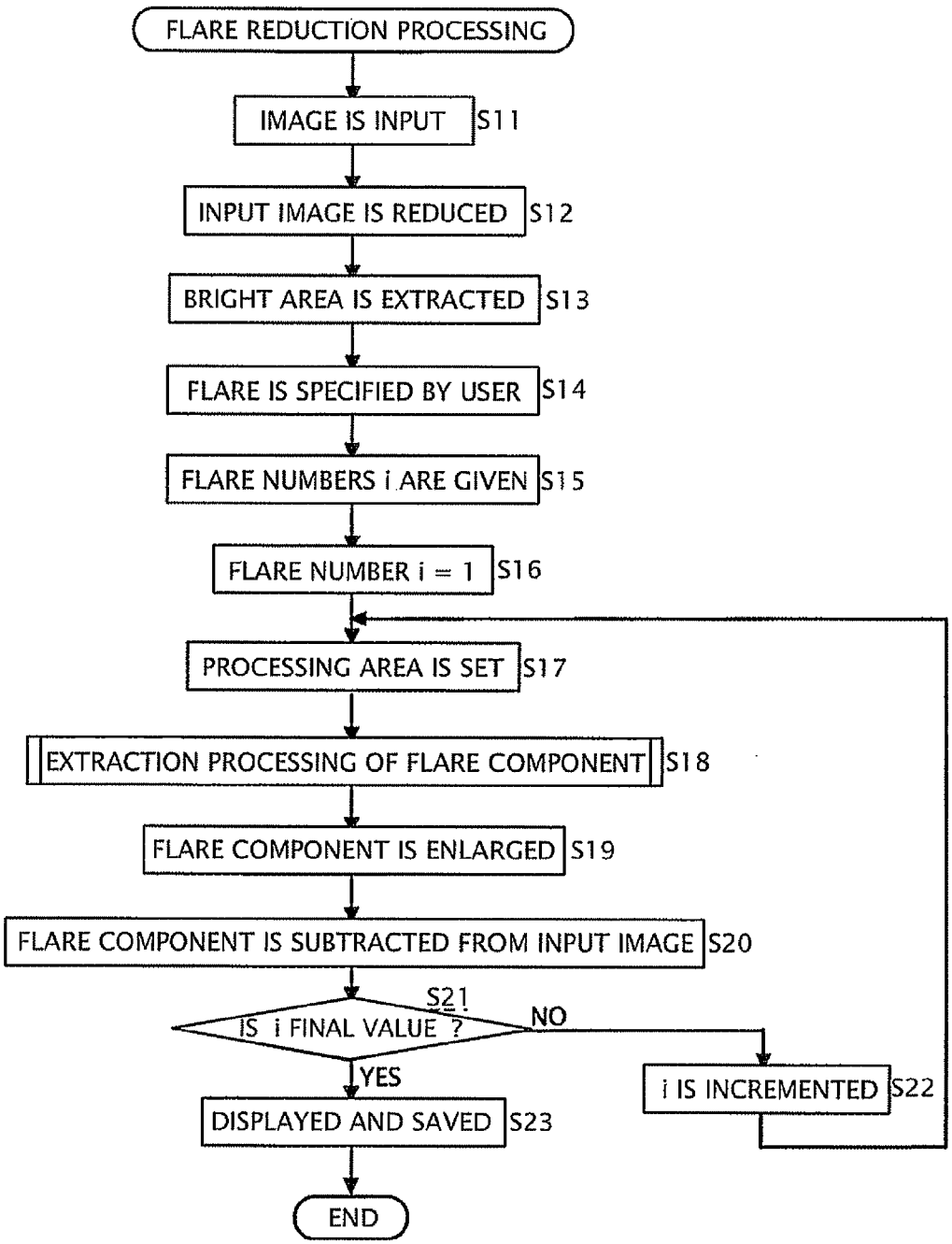
FIG. 2 is an operation flow chart of flare reduction processing performed by a CPU 14.

FIG. 2 is an operation flow chart of the flare reduction processing performed by the CPU 14. Hereinafter, respective steps will be described in order.

Step S11: The CPU 14 reads image data of a color image specified by a user as a target of the flare reduction processing, on the memory 15 (this is referred to as an "input image I", hereinafter). This input image I is, for example, an image that is already written into the storage medium of the data reading section 12.

Figure 3:
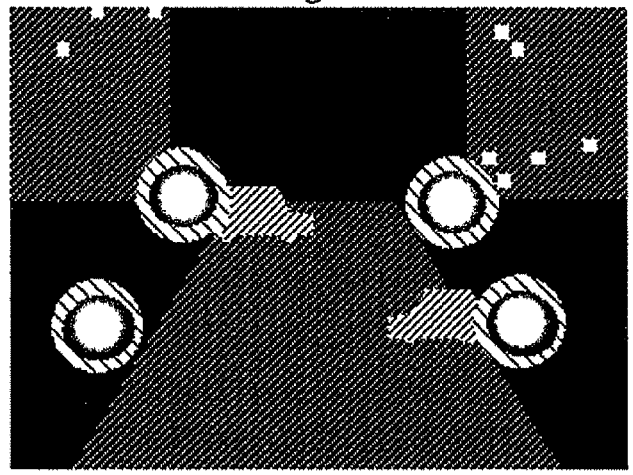
FIG. 3 is a schematic diagram of an input image.

Here, the input image I is an image in which a color flare occurs. The image in which the color flare occurs is an image shot by a shooting optical system including a DOE, and is an image of an outdoor parking lot at night illuminated by dotted lights as illustrated in FIG. 3, or the like, for example. Normally, the color flare has a pattern in a ring-belt shape or close to the ring-belt shape, but, the pattern does not always take a perfect ring-belt shape, and it depends on shooting conditions (an imaging characteristic of a shooting optical system used for shooting an image, a wavelength spectrum of a bright point existed in a shooting angle of view at the time of shooting and the like).

However, the flare reduction processing of the present embodiment can be executed even if the pattern of the color flare is not known, so that there is no problem if shooting condition data is not attached to the input image I. Further, since the flare reduction processing of the present embodiment is also effective for an achromatic flare, the flare occurred in the input image I may also be the achromatic flare.

Step S12: The CPU 14 performs size reduction processing on the input image I read on the memory 15. Hereinafter, the size-reduced input image I is referred to as a "reduced image S". Note that the reason why the size reduction processing is performed on the input image I is to reduce a calculation load in the following steps S13 to S18.

Figure 4:
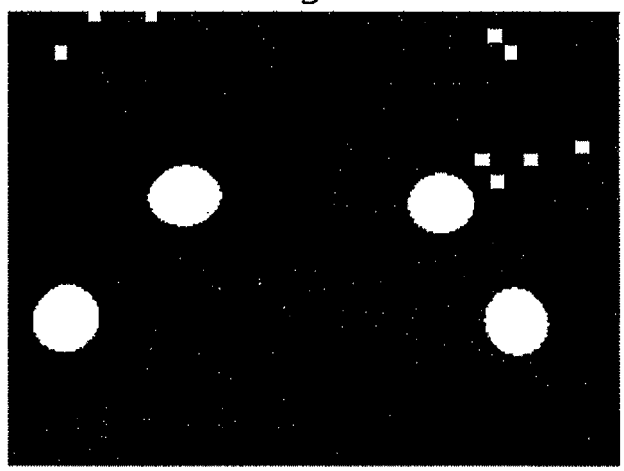
FIG. 4 is an example of a result of detecting bright areas.

Step S13: The CPU 14 compares a luminance of each pixel in the reduced image S with a previously determined threshold value to detect, from the reduced image S, a bright area whose luminance exceeds the threshold value, and displays the detection result on the monitor 19, as illustrated in FIG. 4, for example. As illustrated in FIG. 4, not only an area formed due to a flare but also an area formed irrelevant to the flare (an image of bright window in FIG. 4) may also be mixed in the detected areas.

Note that in the present step, in order to reduce the calculation load, a sum of respective color components (a sum of R, G, and B) of each pixel may be used instead of using a luminance value (a weighted sum of R, G, and B) of each pixel, as an index of luminance of each pixel. Alternatively, it is also possible to use a value of color component representing each pixel (G intensity), as an index of luminance of each pixel. Further, the method of reducing the calculation load as described above can also be applied to another step handling the luminances of pixels.

Figure 5:
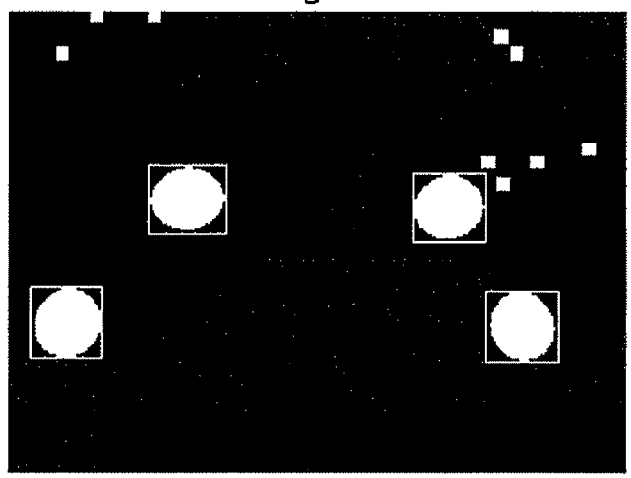
FIG. 5 is an example of a result of specification made by a user.

Step S14: The CPU 14 allows a user to specify the area formed due to the flare, from the detected areas. The user operates the input device 18 while visually checking the monitor 19, thereby specifying one or a plurality of areas judged as the flare, to the computer 11 (refer to FIG. 5). Hereinafter, the area specified by the user is referred to as a "specified area".

Figure 6:
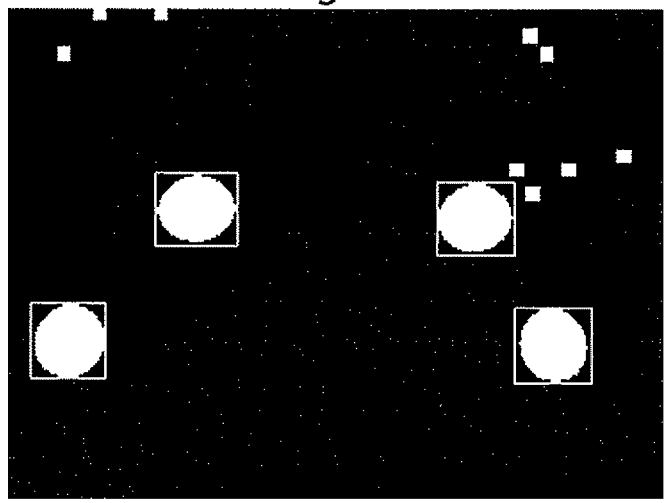
FIG. 6 is an example of flare numbers i.

Step S15: The CPU 14 gives serial numbers (flare numbers i=1, 2, ...) to the one or the plurality of specified areas (refer to FIG. 6). Accordingly, the total number of flares to be reduced in the flare reduction processing (namely, a final value of the flare number i) is decided.

Step S16: The CPU 14 sets the flare number i to an initial value (1).

Figure 7:
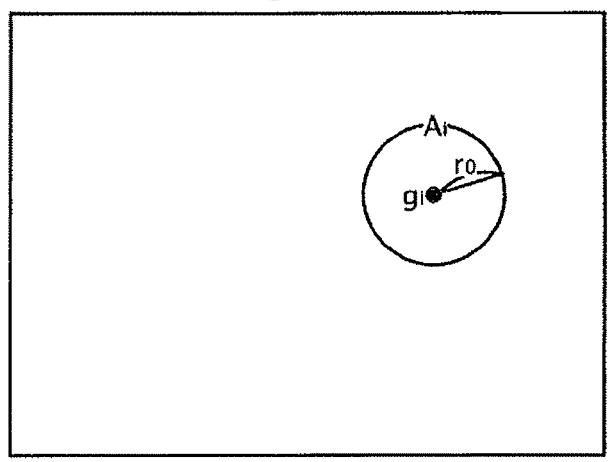
FIG. 7 is a view explaining a processing area $A_i$.

Step S17: The CPU 14 calculates coordinates $g_i$ corresponding to a luminance barycenter of the specified area to which the flare number i is given on the reduced image S. Further, the CPU 14 sets, on the reduced image S, a circular area having the coordinates $g_i$ as its center and having a radius $r_0$, as a processing area $A_i$ of the flare number i (refer to FIG. 7). A value of the radius $r_0$ is a previously determined value so that the processing area $A_i$ can cover the entire flare.

Note that in the present step, the luminance barycenter of the specified area is set as the coordinates $g_i$, but, it is also possible to set a center of the specified area as the coordinates $g_i$, in order to reduce the calculation load.

Step S18: The CPU 14 gives an instruction to the flare extracting section 21 to extract a flare component $F_i$ from the processing area $A_i$. The flare extracting section 21 executes flare extraction processing to extract the flare component $F_i$ from the processing area $A_i$. Details of the flare extraction processing will be described later.

Step S19: The CPU 14 performs size enlargement processing on the flare component $F_i$ extracted in step S18. Note that when the size of the input image I is reduced by 1/M times in the size reduction processing in the aforementioned step S12, the size of the flare component $F_i'$ is enlarged by M times in the size enlargement processing in the present step. Accordingly, a flare component $F_i'$ having a size corresponding to that of the input image I is obtained in the present step.

Step S20: The CPU 14 subtracts the flare component $F_i'$ obtained in step S19 from the input image I. Note that when performing the subtraction, the CPU 14 determines, based on the coordinates $g_i$ on the reduced image S and the aforementioned magnification M, coordinates $g_i'$ on the input image I corresponding to the coordinates $g_i$, and makes a center of the flare component match the coordinates $g_i'$. Accordingly, it is possible to reduce the flare component $F_i'$ corresponding to the flare number i from the input image I.

Step S21: The CPU 14 discriminates whether or not the flare number i reaches the final value, in which when the number does not reach the final value, the process proceeds to step S22, and when the number reaches the final value, the process proceeds to step S23.

Step S22: The CPU 14 increments the flare number i, and the process proceeds to step S17. Therefore, flare components (flare components $F_1'$, $F_2'$, ...) of all of the flare numbers are sequentially reduced from the input image I.

Step S23: The CPU 14 displays the input image I in which all of the flare components (flare components $F_1'$, $F_2'$, ...) are reduced (referred to as an "image E with no flare", hereinafter), on the monitor 19. Thereafter, when a saving instruction is input by the user, the image E with no flare is saved in a saving destination specified by the user (for example, a storage medium inserted into the data reading section 12), and the flow is terminated.

Figure 8:
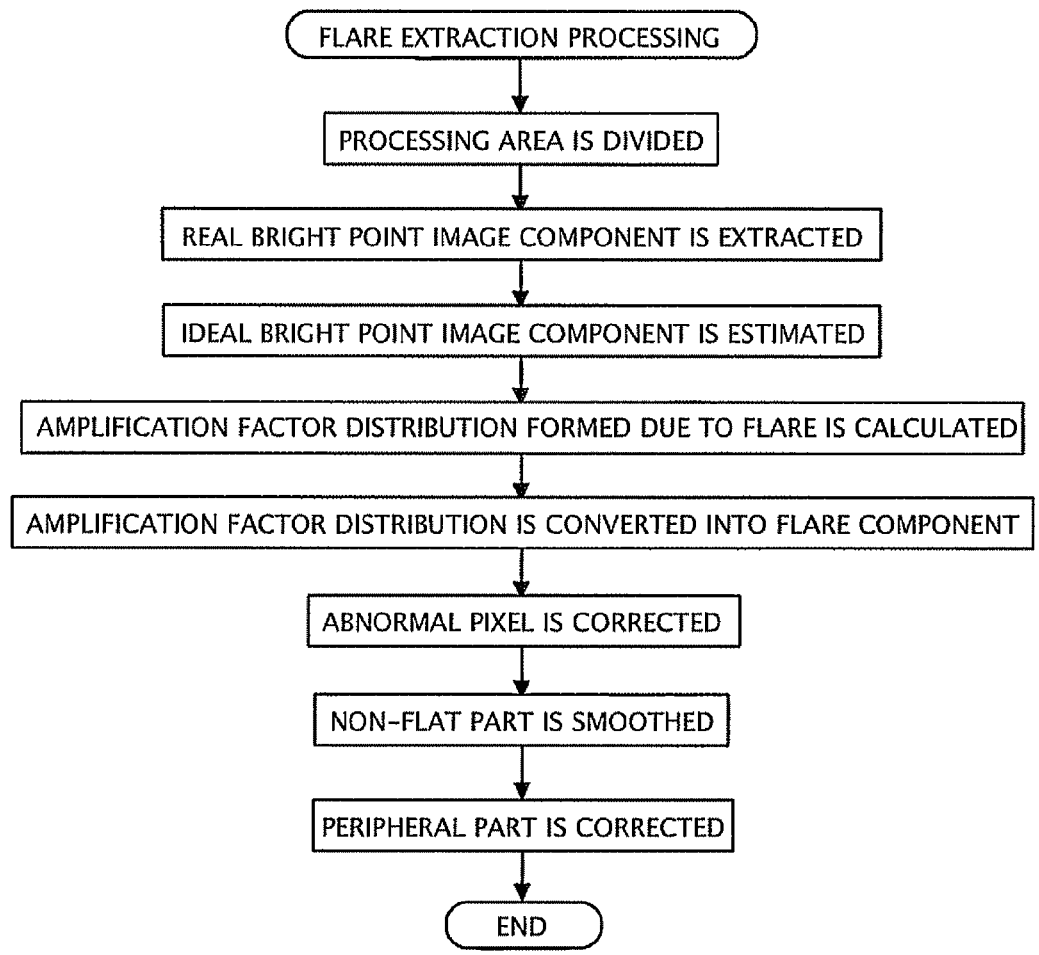
FIG. 8 is a flow chart of flare extraction processing performed by a flare extracting section 21.

FIG. 8 is a flow chart of the flare extraction processing performed by the flare extracting section 21. Hereinafter, respective steps will be described in order.

Figure 9A:
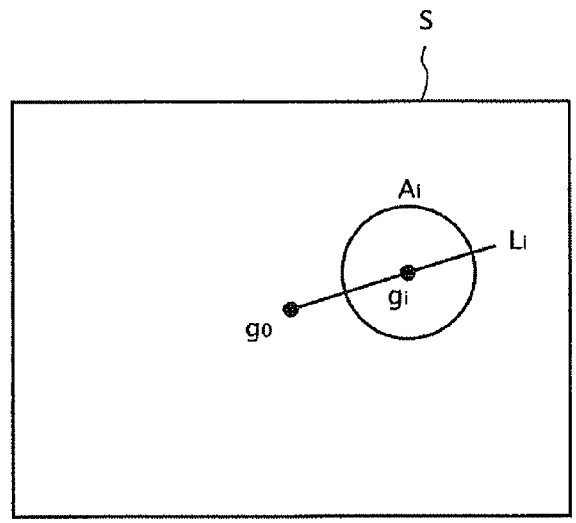
FIGS. 9A and 9B are views explaining a method of dividing the processing area $A_i$.
Figure 9B:
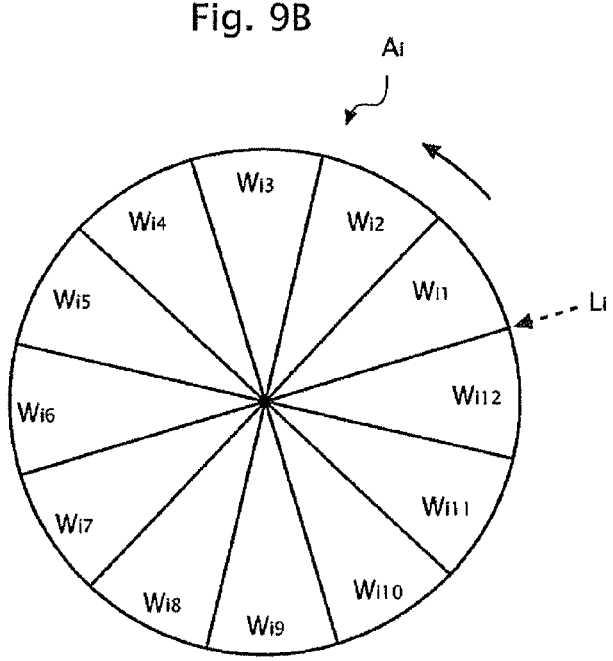

Step S181: As illustrated in FIG. 9A, the flare extracting section 21 determines a straight line $L_i$ passing through the coordinates $g_i$ corresponding to a center of the processing area $A_i$ in the reduced image S and a center $g_0$ of the reduced image S (namely, a position corresponding to an optical axis of the shooting optical system). Further, as illustrated in FIG. 9B, the flare extracting section 21 divides the processing area $A_i$ by an equal angle in a circumferential direction (θ direction) around the coordinates $g_i$ as a reference. Accordingly, the processing area $A_i$ is divided into a plurality of fan-shaped areas (fan-shaped areas $W_{i1}$ to $W_{i12}$). Note that the flare extracting section 21 disposes the dividing lines in a radial direction (r direction) used for the division, in a symmetrical relation with respect to the straight line $L_i$, as illustrated in FIG. 9. If it is designed such that the processing area $A_i$ is divided by such dividing lines and the subsequent respective processing (steps S182 to S186) are performed for each of fan-shaped areas $W_{ij}$, it is possible to efficiently extract the flare component with a certain accuracy (this is because the shooting optical system has a rotationally symmetrical shape, so that a pattern of flare component included in the processing area $A_i$ should take a pattern symmetrical with respect to the straight line $L_i$).

Figure 10A:
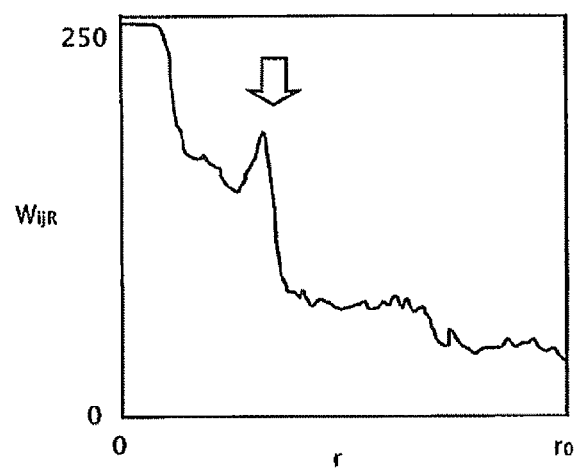
FIGS. 10A, 10B, and 10C are examples of intensity distributions of a fan-shaped area $W_{ij}$ in its radial direction.
Figure 10B:
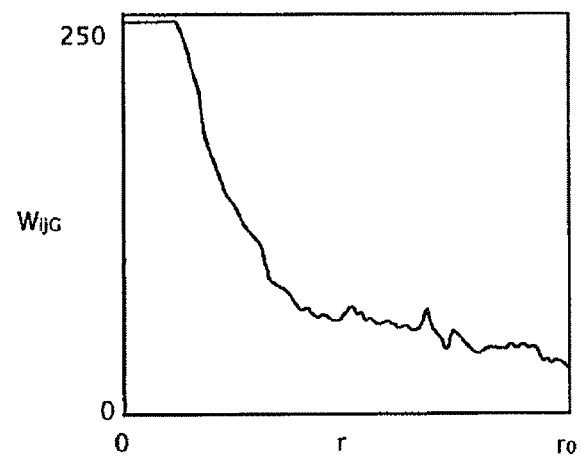
Figure 10C:
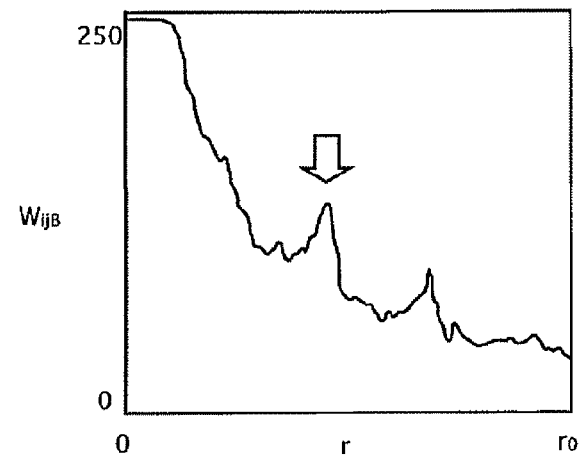

Here, what are illustrated in FIG. 10 are intensity distributions of R, G, and B, respectively, of a certain fan-shaped area $W_{ij}$ in its radial direction. Each of an R component $W_{ijR}$, a G component $W_{ijG}$, and a B component $W_{ijB}$ is indicated by a curve so as to be attenuated toward a peripheral edge part (part of $r=r_0$) of the fan-shaped area $W_{ij}$, and each of the R component $W_{ijR}$, the G component $W_{ijG}$, and the B component $W_{ijB}$ is formed of a sum of an ideal bright point image component, a flare component, and a background component.

Figure 13:
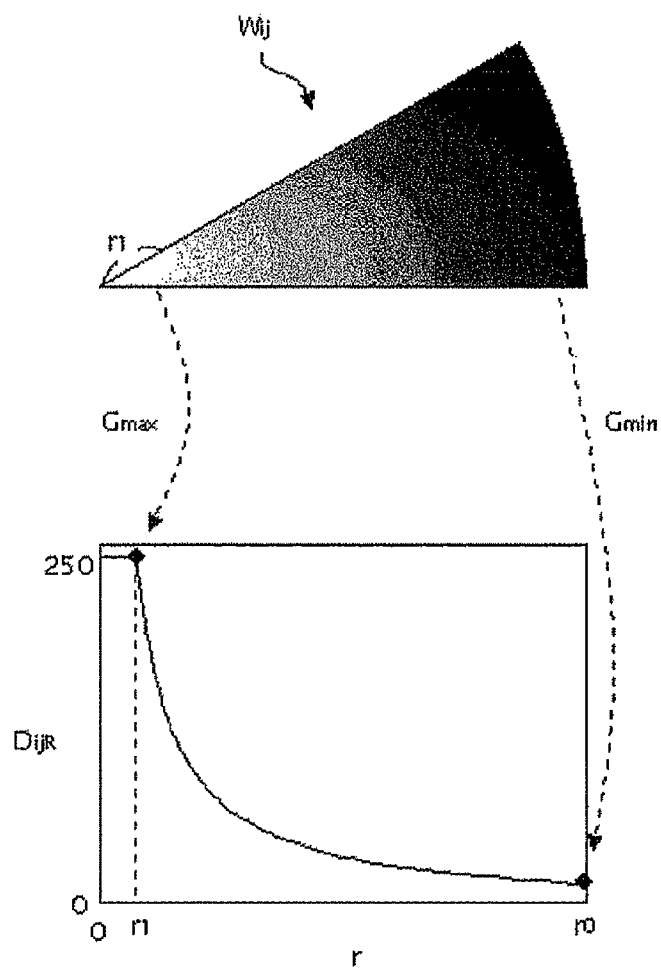
FIG. 13 is a view explaining a method of estimating an ideal bright point image component $D_{ij}$.

Among the above, the ideal bright point image component is indicated by a smooth curve as illustrated in a lower portion of FIG. 13, for example, which can be regarded as common among the R component $W_{ijR}$, the G component $W_{ijG}$, and the B component $W_{ijB}$. Meanwhile, the flare component and the background component mutually differ among the R component $W_{ijR}$, the G component $W_{ijG}$, and the B component $W_{ijB}$.

For instance, in the R component $W_{ijR}$, there occurs a large peak peculiar to the R component $W_{ijR}$ as indicated by an arrow mark, and this peak can be mainly considered as a flare component in the R intensity distribution. Further, also in the B component $W_{ijB}$, there occurs a large peak peculiar to the B component $W_{ijB}$ as indicated by an arrow mark, and this peak can be mainly considered as a flare component in the B intensity distribution. Meanwhile, although it seems that a large peak peculiar to the G component $W_{ijG}$ does not occur in the G component $W_{ijG}$, actually, there is a possibility that the G component $W_{ijG}$ also includes a flare component.

Further, in a lot of cases, spatial frequencies of these flare components are lower than spatial frequencies of the background components (it can be considered that a waveform that wiggles in FIG. 10 indicates the background component). Further, in a lot of cases, the flare component takes a pattern in a ring-belt shape with r=0 as its center, or a pattern in a shape close to the ring-belt shape (refer to FIG. 3). Accordingly, the spatial frequency in a circumferential direction of the flare component can be regarded to be lower than the spatial frequency in a circumferential direction of the background component.

Figure 12:
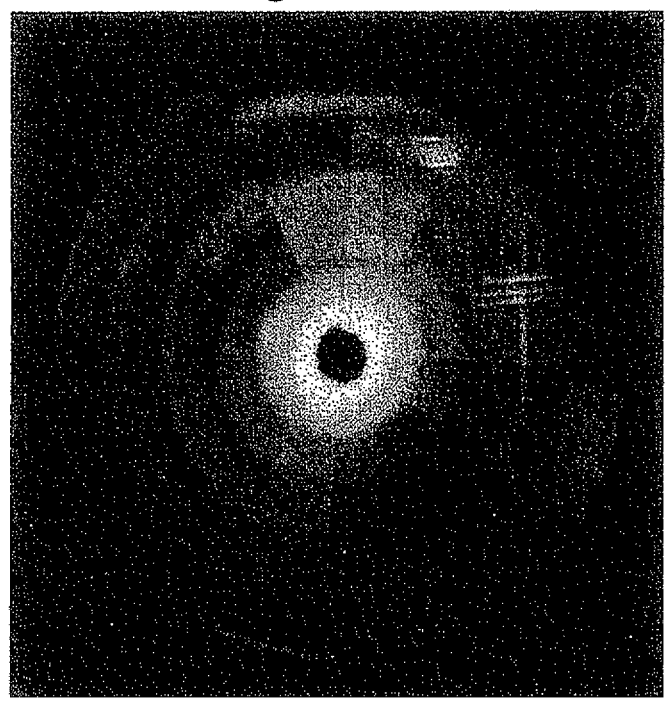
FIG. 12 is an example of a processing area (=real bright point image component) $A_i'$ after performing the smoothing.

Step S182: The flare extracting section 21 individually performs smoothing on each of the fan-shaped areas $W_{i1}$ to $W_{i12}$ along the circumferential direction, to thereby obtain fan-shaped areas $W_{i1}'$ to $W_{i12}'$ after performing the smoothing (=processing area $A_i'$ after performing the smoothing). The smoothing is performed for each of R, G, and B. FIGS. 11A and 11B illustrate states of an R component $W_{ijR}$ of a certain fan-shaped area $W_{ij}$ before and after performing the smoothing, and what is illustrated in FIG. 12 is an example of fan-shaped areas $W_{i1}'$ to $W_{i12}'$ after performing the smoothing (=processing area $A_i'$ after performing the smoothing).

As described above, since the spatial frequency in the circumferential direction of the background component is higher than the spatial frequency in the circumferential direction of the flare component, the processing area $A_i'$ after performing the smoothing (refer to FIG. 12) includes almost no background component. Accordingly, it can be regarded that the processing area $A_i'$ after performing the smoothing (refer to FIG. 12) represents a real bright point image component including the flare component (=a sum of the flare component and the ideal bright point image component). Therefore, hereinafter, the processing area $A_i'$ after performing the smoothing is referred to as a "real bright point image component $A_i'$".

Step S183: The flare extracting section 21 estimates, based on the processing area $A_i$ before performing the smoothing, an ideal bright point image component $D_i$ included in the processing area $A_i$. Note that in this case, the ideal bright point image component $D_i$ is assumed to have an achromatic color (intensity distributions of respective color components are mutually equal). Further, in this case, it is assumed that the ideal bright point image component $D_i$ is estimated for each of the fan-shaped areas $W_{ij}$.

In that case, each of ideal bright point image components $D_{ij}$ (formed of an R component $D_{ijR}$, a G component $D_{ijG}$, and a B component $D_{ijB}$) regarding the individual fan-shaped areas $W_{ij}$ is estimated through the following steps (a) to (d).

(a) As illustrated in FIG. 13, the flare extracting section 21 compares luminances of respective pixels on the fan-shaped area $W_{ij}$ before performing the smoothing with one another, and finds out a G intensity of a pixel having the lowest luminance on the fan-shaped area $W_{ij}$ ($G_{ijmin}$) and a G intensity of a pixel having the highest luminance on the area ($G_{ijmax}$). Normally, a vicinity of a center of the fan-shaped area $W_{ij}$ (a vicinity of a center of the processing area $A_i$) is a saturation area in which a pixel value is saturated, so that the $G_{ijmax}$ becomes the same as a G intensity in the saturation area.

(b) The flare extracting section 21 sets the R component $D_{ijR}$ of the ideal bright point image component $D_{ij}$ as represented by the following equation (1).

$$\begin{cases} D_{ijR}(r) = G_{ijmax} & (\text{for } r \leq r_1) \\ D_{ijR}(r) = a/r + b & (\text{for } r_1 < r) \end{cases}$$

Note that in the equation (1), r indicates a radial position, and $r_1$ indicates a radial position corresponding to a contour of the saturation area. Further, a combination of a and b is set to a combination that satisfies $D_{ijR}(r) = G_{ijmax}$ when $r = r_1$, and satisfies $D_{ijR}(r) = G_{ijmin}$ when $r = r_0$.

(c) The flare extracting section 21 sets the G component $D_{ijG}$ of the ideal bright point image component $D_{ij}$ as represented by the following equation (2).

$$\begin{cases} D_{ijG}(r) = G_{ijmax} & (\text{for } r \leq r_1) \\ D_{ijG}(r) = a/r + b & (\text{for } r_1 < r) \end{cases}$$

Note that $r_1$, a and b in the equation (2) take the same values as those of $r_1$, a and b in the equation (1).

(d) The flare extracting section 21 sets the B component $D_{ijB}$ of the ideal bright point image component $D_{ij}$ as represented by the following equation (3).

$$\begin{cases} D_{ijB}(r) = G_{ijmax} & (\text{for } r \leq r_1) \\ D_{ijB}(r) = a/r + b & (\text{for } r_1 < r) \end{cases}$$

Note that $r_1$, a and b in the equation (3) take the same values as those of $r_1$, a and b in the equation (1).

Accordingly, when the steps (a) to (d) described above are performed on all of the fan-shaped areas $W_{i1}$ to $W_{i12}$, the ideal bright point image component $D_i$ regarding the entire processing area $A_i$ is estimated.

Figure 14:
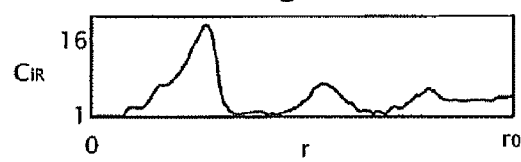
FIG. 14 is an example of an amplification factor distribution $C_i$.

Step S184: The flare extracting section 21 divides the real bright point image component $A_i'$ extracted in step S182 by the ideal bright point image component $D_i$ estimated in step S183, thereby calculating a luminance amplification factor distribution $C_i$ generated in the processing area $A_i$ due to the flare ($C_i = S_i'/D_i$). The calculation is performed for each of R, G, and B. FIG. 14 illustrates an example of an R component $C_{iR}$ in a certain circumferential position of the calculated amplification factor distribution $C_i$.

Figure 15:
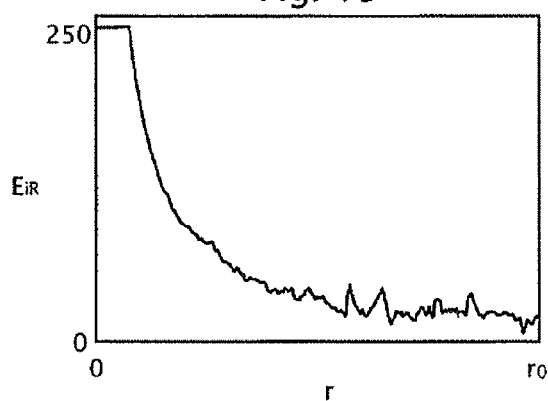
FIG. 15 is an example of an image with no flare $E_i = A_i/C_i$.

Here, when the processing area $A_i$ is divided by the amplification factor distribution $C_i$, it is possible to easily calculate an image $E_i$ with no flare of the processing area $A_i$ (note that the division is performed for each of R, G, and B). What is illustrated in FIG. 15 is an example of an R component $E_{iR}$ of the image $E_i$ with no flare calculated by the division.

However, there is a possibility that an extraction error occurs in the aforementioned step S182, so that a background component which is too bright and thus cannot be completely reduced in step S182 (remaining background component) may remain in the real bright point image component $A_i'$ extracted in step S182. Accordingly, it may not be possible to calculate, with the use of the above-described division, the image $E_i$ with no flare with high accuracy.

Therefore, in order to realize the reduction in the remaining background component, the flare extracting section 21 of the present embodiment converts the amplification factor distribution $C_i$ into a flare component $F_i$ in the following step.

Step S185: The flare extracting section 21 converts the amplification factor distribution $C_i$ into the flare component $F_i$ through an equation of $F_i = (1 - 1/C_i) \times A_i$. The conversion is performed for each of R, G, and B.

Figure 16:
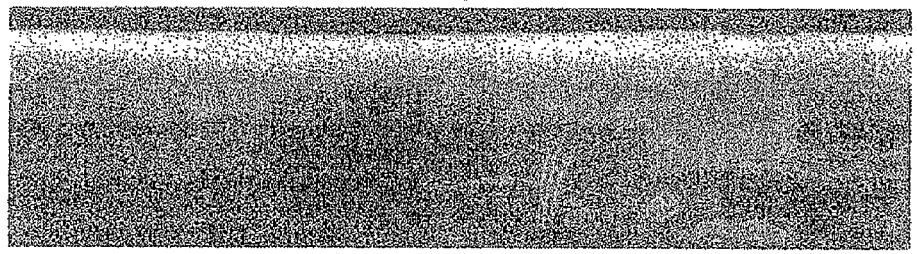
FIG. 16 is an example of a flare component $F_i$ obtained in step S185.
Figure 17:
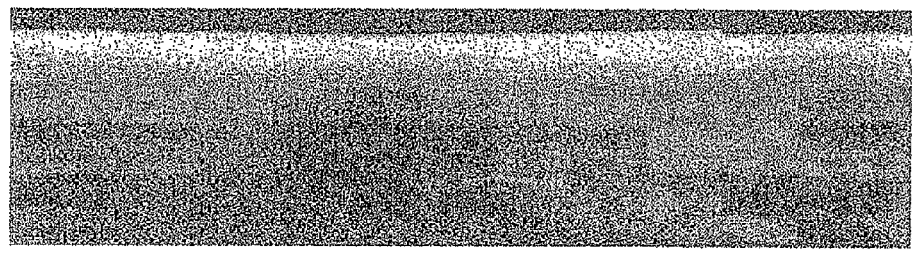
FIG. 17 is an example of a flare component $F_i$ obtained in step S185.
Figure 18:
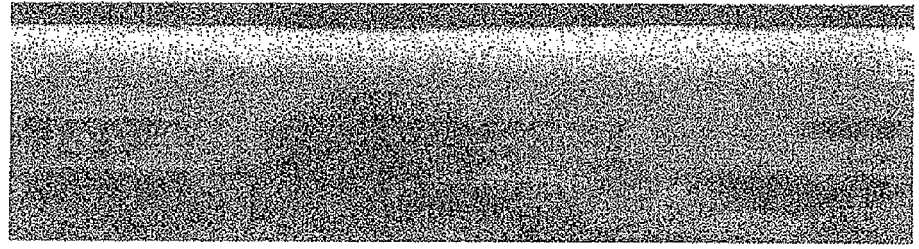
FIG. 18 is an example of a flare component $F_i$ obtained in step S187.

What is illustrated in FIG. 16 is an example of the flare component $F_i$ obtained in the present step. In FIG. 16, a circumferential direction is taken as a horizontal direction, and a radial direction is taken as a vertical direction (the same applies to FIG. 17 and FIG. 18). In the flare component $F_i$ obtained in the present step, there occurs an area which seems too bright as a flare component. This area can be considered as an area affected by the remaining background component.

Step S186: The flare extracting section 21 compares a luminance of each pixel of the flare component $F_i$ with a threshold value to find out an abnormal pixel whose luminance exceeds the threshold value, and replaces values (R, G, and B) of the abnormal pixel with average values (an average value of R, an average value of G, and an average value of B) of a normal pixel group arranged with the abnormal pixel in a circumferential direction. Accordingly, the luminance of the abnormal pixel is corrected to a luminance which is equal to that of the normal pixel group, and the remaining background component is reduced from the flare component $F_i$ (refer to FIG. 17).

Note that in the present step, the normal pixel group used for correcting the abnormal pixel is designed to be selected from the same fan-shaped area as that to which the abnormal pixel belongs.

Step S187: The flare extracting section 21 performs smoothing on a non-flat part of luminance occurred in the flare component $F_i$ (FIG. 17) obtained in step S186, along a circumferential direction (refer to FIG. 18). The non-flat part corresponds to a borderline between mutually adjacent two fan-shaped areas $W_{ij}$ and $W_{ij+1}$, so that when the part is previously smoothed, it is possible to prevent a radial non-flatness from appearing on the final image with no flare (image E with no flare).

Figure 19:
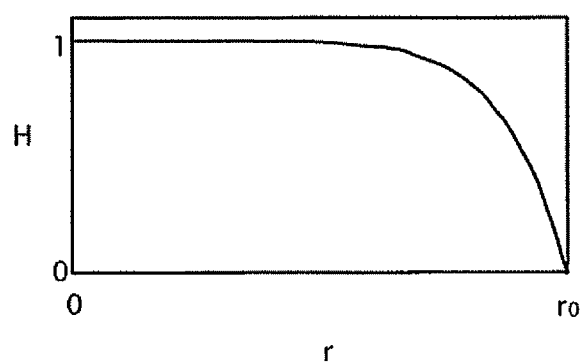
FIG. 19 is an example of a correction coefficient distribution H.

Step S188: The flare extracting section 21 multiplies the flare component $F_i$ (refer to FIG. 18) obtained in step S187 by a correction coefficient distribution H such as illustrated in FIG. 19, thereby making a most peripheral edge part (part of $r = r_0$) of the flare component $F_i$ have a black pixel (or a value extremely close to that of the black pixel). The correction coefficient distribution H is represented by a function of the radial position r, as described below.

$$H(r) = 1 - (r/r_0)^8$$

Note that the multiplication in the present step is performed for each of R, G, and B, in which the correction coefficient distribution H is set to be common among R, G, and B.

Figure 20:
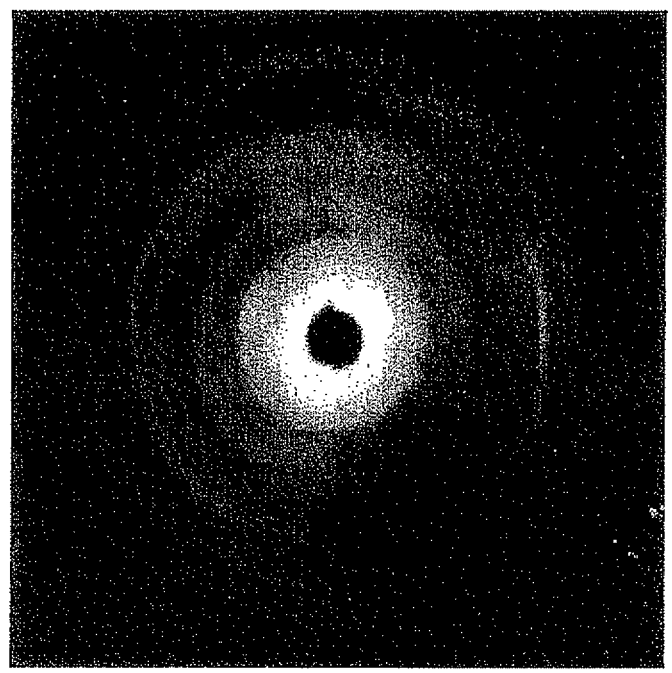
FIG. 20 is an example of a flare component $F_i$ obtained in step S188.

According to the present step described above, although values of a lot of pixels of the flare component $F_i$ do not change almost at all, values of pixels close to the peripheral edge part out of pixels of the flare component $F_i$ are further approximated to the value of the black pixel, as the pixels become closer to the peripheral edge part. FIG. 20 is an example of the flare component $F_i$ obtained in the present step. As above, when the peripheral edge part of the flare component $F_i$ is previously set to have the black pixels, it is possible to prevent a circular contour from appearing on the final image with no flare (image E with no flare).

Note that at a point in time at which the processing of the present step is completed, the flow in FIG. 8 conducted by the flare extracting section 21 is terminated, and step S19 in FIG. 2 performed by the CPU 14 is started (the above is the description of step S188).

As described above, the flare extracting section 21 of the present embodiment estimates the ideal bright point image component $D_i$ included in the processing area $A_i$, and at the same time, it extracts the real bright point image component $A_i'$ from the processing area $A_i$. Further, the flare extracting section 21 calculates a difference between the both components (in this case, the amplification factor distribution $C_i = A_i'/D_i$), as an index of flare component $F_i$ included in the processing area $A_i$.

Here, it can be assumed that the ideal bright point image component $D_i$ is represented by a simple distribution as illustrated in the lower portion of FIG. 13, so that the estimation of the ideal bright point image component $D_i$ can be conducted with high accuracy even without using the shooting condition data. Therefore, the CPU 14 of the present embodiment can perform calculation of the index of flare component $F_i$ (in this case, the amplification factor distribution $C_i = A_i'/D_i$) easily with high accuracy.

Figure 21:
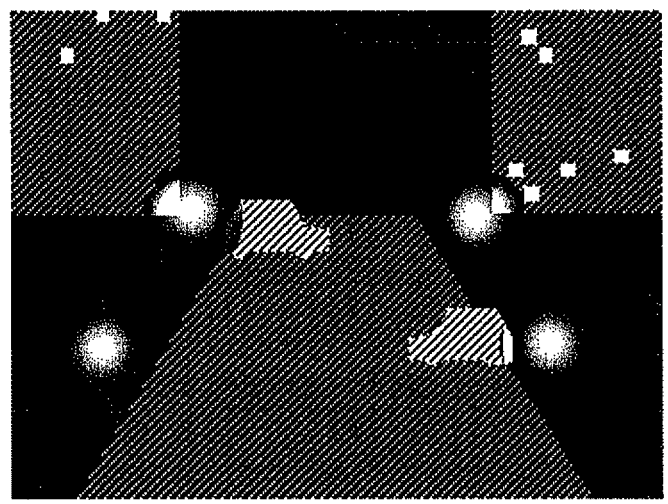
FIG. 21 is a schematic diagram of an image E with no flare.

As a result of this, the CPU 14 of the present embodiment can obtain a good image E with no flare. As schematically illustrated in FIG. 21, the flare such as illustrated in FIG. 3 does not occur in the image E with no flare, and an ideal bright point image, instead of the flare, appears on the image.

Further, the flare extracting section 21 of the present embodiment converts the amplification factor distribution $C_i$ into the flare component $F_i$ before calculating the image E with no flare from the amplification factor distribution $C_i$, thereby realizing the detection and reduction of the error included in the amplification factor distribution $C_i$ (the aforementioned remaining background component). As above, by converting the amplification factor distribution $C_i$ into the flare component $F_i$, it is possible to emphasize the component which is not appropriate as the flare component (the aforementioned remaining background component), so that the detection and reduction of the component are securely conducted.

Note that in the aforementioned step S186, the flare extracting section 21 corrects the abnormal pixel in the flare component $F_i$ based on the peripheral pixels, but, the correction can also be conducted based on a corresponding pixel of the flare component $F_i$ (pixel symmetrical with respect to the straight line $L_i$). Further, in that case, the values of the abnormal pixel can also be replaced with the same values as those of the corresponding pixel.

Further, in the equations (1), (2), and (3) in the aforementioned step S183, the function $f(r)=a/r+b$ is used as the function $f(r)$ under the condition of $r_1 < r$, but, it is also possible to use functions such as $f(r)=a/r^2+b$ and $f(r)=a/r^3+b$, which are represented by using $(1/r)^n$ being a power of $(1/r)$, instead of $(1/r)$. Further, it is also possible to design such that, among several functions $f(r)=a/r^n+b$ in which a power number n is different, a function having a curve closest to a distribution curve of the fan-shaped area $W_{ij}$ in its radial direction is selected to be adopted.

Further, in the aforementioned flare reduction processing, in order to reduce the calculation load in steps S13 to S18, a size reduced version of the input image I (reduced image S) is used instead of using the input image I as it is, but, if it is desired to give priority to the enhancement in the flare reduction accuracy over the reduction in the calculation load, it is also possible to use the input image I as it is. Note that in that case, the processing in steps S12 and S19 are omitted.

Further, in the aforementioned flare reduction processing, the occurrence position of flare in the input image I is manually specified by the user, but, the position can also be automatically detected by the CPU 14. For detecting the occurrence position of flare, any of publicly-known detection methods can be applied. For example, it is possible to apply a detection method using a technology of pattern recognition or the like.

Second Embodiment

Hereinafter, a second embodiment of the present application will be described.

Figure 22:
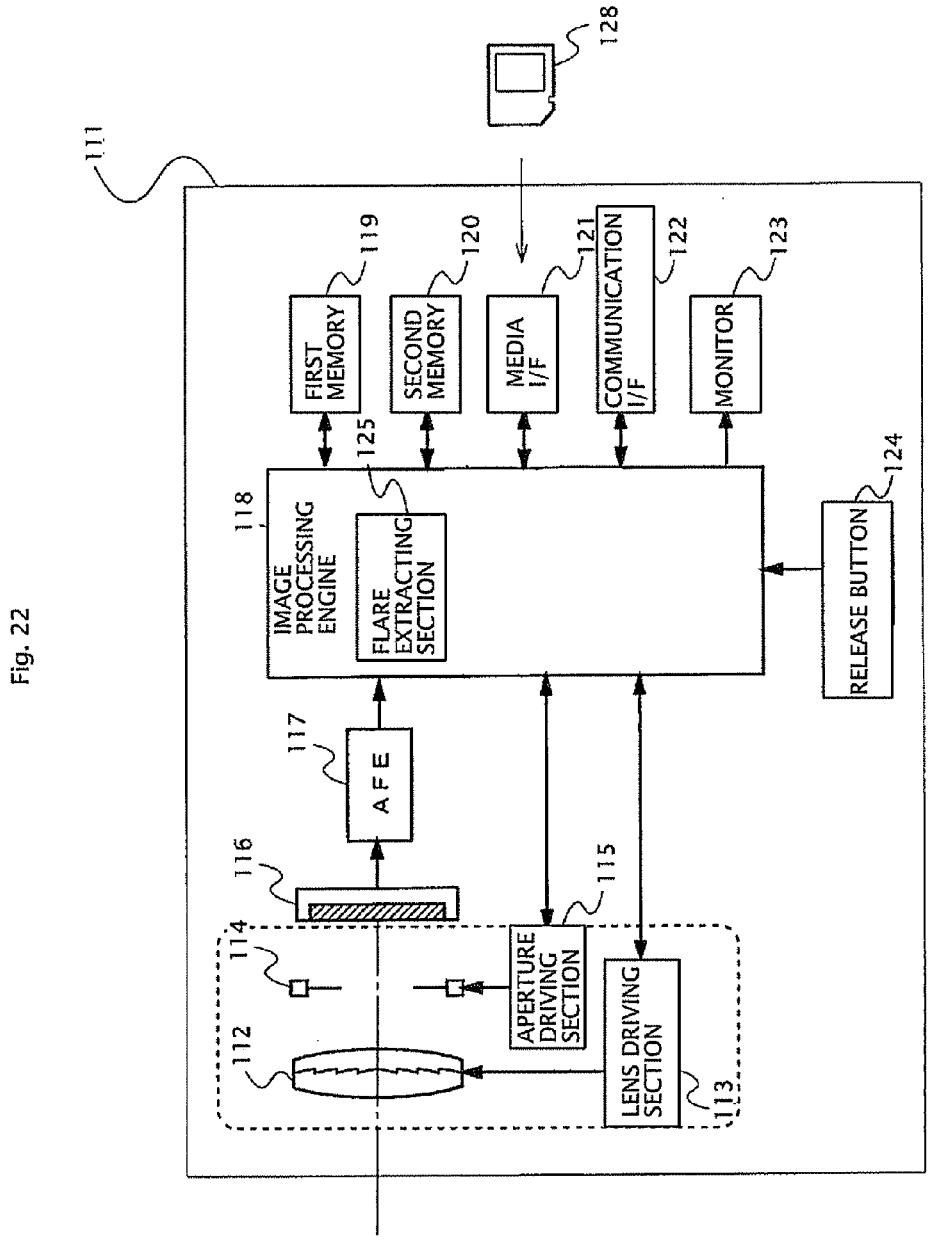
FIG. 22 is a block diagram illustrating a configuration example of an electronic camera of a second embodiment.

FIG. 22 is a block diagram illustrating a schematic configuration of an electronic camera. As illustrated in FIG. 22, an electronic camera 111 includes a shooting optical system 112, a lens driving section 113, an aperture 114, an aperture driving section 115, a color imaging device 116, an AFE 117, an image processing engine 118, a first memory 119, a second memory 120, a media I/F 121, a communication I/F 122, a monitor 123 and a release button 124, and among the above, the lens driving section 113, the aperture driving section 115, the AFE 117, the first memory 119, the second memory 120, the media I/F 121, the communication I/F 122, the monitor 123, and the release button 124 are respectively connected to the image processing engine 118. Further, the shooting optical system 112 is a high-functional shooting optical system including a DOE lens, for example.

The first memory 119 is formed of a volatile storage medium (an SDRAM or the like), and temporarily stores a captured image in a pre-process or post-process of image processing performed by the image processing engine 118. Meanwhile, the second memory 120 is formed of a nonvolatile storage medium such as a flash memory, and stores a program executed by the image processing engine 118 over a long period of time.

The first memory 119 stores an image processing program to be executed by the image processing engine 118, and the image processing program includes a function of flare reduction processing which is the same as that of the first embodiment. When the flare reduction processing is carried out, the image processing engine 118 functions as a flare extracting section 125. The flare extracting section 125 operates in the same manner as the flare extracting section 21 in the first embodiment.

Accordingly, the image processing engine 118 of the present embodiment can perform the flare reduction processing which is the same as that of the first embodiment, on an image obtained by the electronic camera 111 through shooting and an image read via the media I/F 121 (or the communication I/F 122).

Note that since the flare reduction processing of the present embodiment does not need shooting condition data, there is no problem that a part indicated by a dotted line in FIG. 22 is exchangeable with respect to the electronic camera 111. Further, it is needless to say that, since the flare reduction processing of the present embodiment does not need the shooting condition data, the image processing engine 118 does not have to read imaging characteristic data of the shooting optical system 112.

Third Embodiment

Hereinafter, a third embodiment of the present application will be described.

Figure 23:
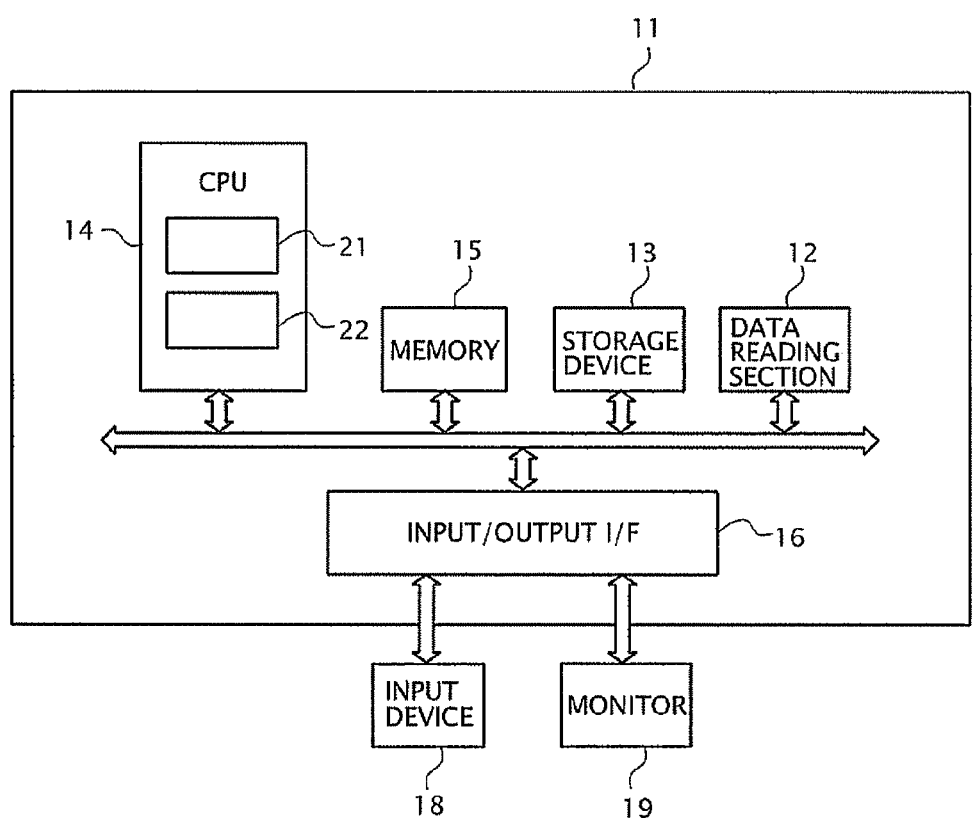
FIG. 23 is a block diagram illustrating a configuration example of an image processing apparatus of a third embodiment.

FIG. 23 is a block diagram illustrating a configuration example of an image processing apparatus of the present embodiment. The image processing apparatus of the present embodiment is formed of a computer 11 in which an image processing program is installed.

The computer 11 illustrated in FIG. 23 includes a data reading section 12, a storage device 13, a CPU 14, a memory 15, an input/output I/F 16, and a bus 17. The data reading section 12, the storage device 13, the CPU 14, the memory 15, and the input/output I/F 16 are mutually connected via the bus 17. Further, an input device 18 (a keyboard, a pointing device or the like) and a monitor 19 are respectively connected to the computer 11 via the input/output I/F 16. Note that the input/output I/F 16 receives respective inputs from the input device 18, and it also outputs data for display to the monitor 19.

The data reading section 12 is used when image data to be an image processing target is read from the outside. For example, the data reading section 12 is formed of a reading device (an optical disk drive, a magnetic disk drive, a magneto-optical disk drive or the like) that obtains image data from a storage medium inserted into the data reading section 12, or a communication device (a USB interface, a LAN module, a wireless LAN module or the like) that communicates with an external device based on a well-known communication protocol.

The storage device 13 is formed of, for example, a storage medium such as a hard disk and a nonvolatile semiconductor memory. An image processing program is recorded in the storage device 13. Note that the storage device 13 can also store the image data read from the data reading section 12.

The CPU 14 is a processor that executes the image processing program stored in the storage device 13 and comprehensively controls respective parts of the computer 11. Here, the image processing program of the present embodiment includes a function of flare color component reduction processing, and when the flare color component reduction processing is carried out, the CPU 14 functions not only as a control section controlling the respective parts but also as a flare color component extraction processing section 21 and a color corrected component extraction processing section 22 (operations of the flare color component extraction processing section 21 and the color corrected component extraction processing section 22 will be described later).

The memory 15 temporarily stores respective calculation results obtained by the image processing program. The memory 15 is formed of a volatile SDRAM or the like, for instance.

Figure 24:
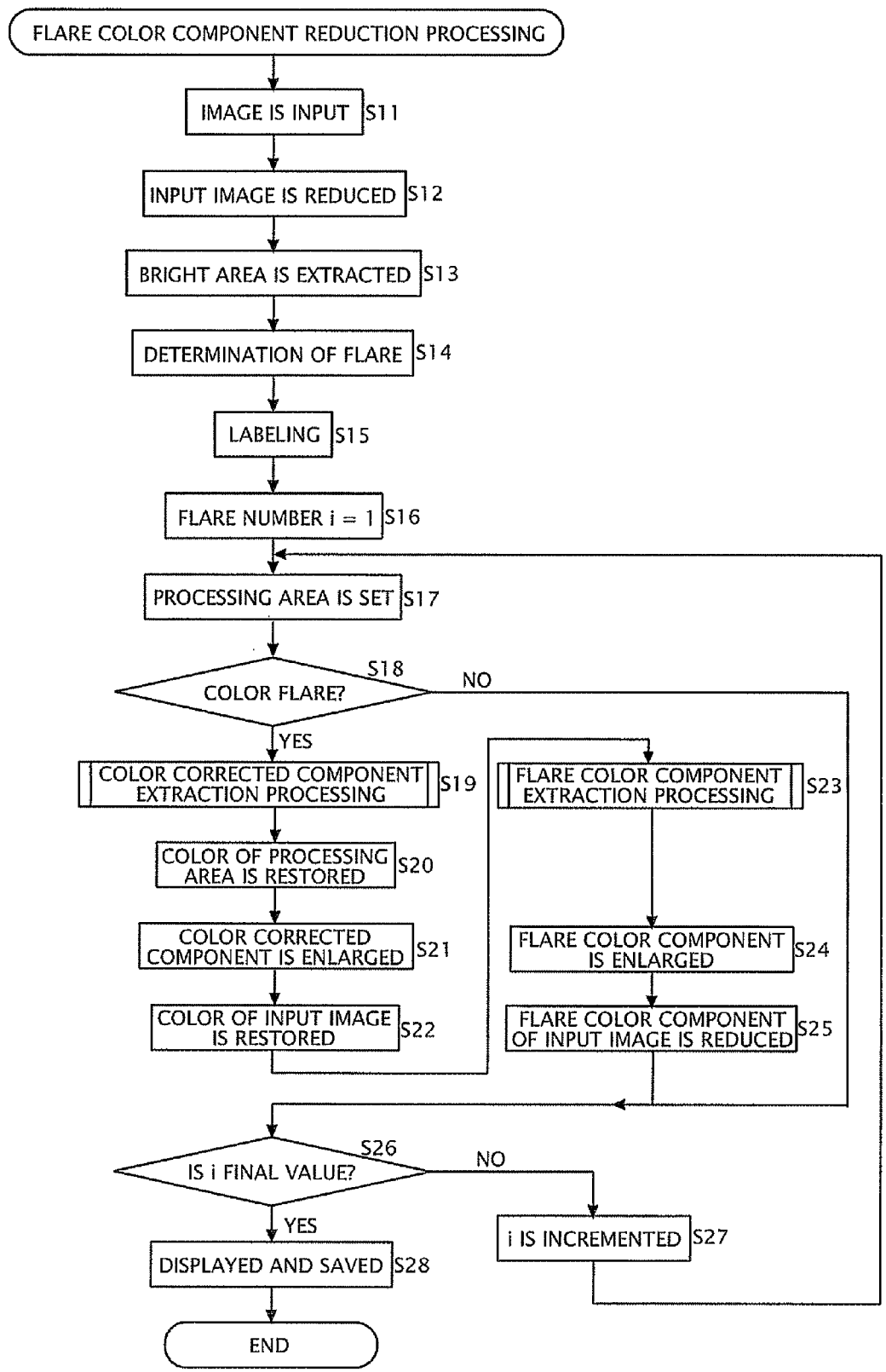
FIG. 24 is an operation flow chart of flare color component reduction processing performed by a CPU 14.

FIG. 24 is an operation flow chart of the flare color component reduction processing performed by the CPU 14. Hereinafter, respective steps will be described in order.

Step S11: The CPU 14 reads image data of a color image specified by a user as a target of the flare color component reduction processing, on the memory 15 (this is referred to as an "input image", hereinafter). This input image is, for example, an image that is already written into the storage medium of the data reading section 12.

Figure 27:
FIG. 27 is an example of an input image.

Here, the input image is an image in which a color flare occurs. The image in which the color flare occurs is an image shot by a shooting optical system including a DOE, and is as illustrated in FIG. 27, for example (note that since FIG. 27 illustrates a monochrome image, no coloring of the color flare appears on the image). Normally, the color flare has a pattern in a ring-belt shape or close to the ring-belt shape, but, the pattern does not always take a perfect ring-belt shape, and it depends on shooting conditions (an imaging characteristic of a shooting optical system used for shooting an image, a wavelength spectrum of a bright point existed in a shooting angle of view at the time of shooting and the like). Further, a colored distribution of the color flare (flare color component) also depends on the shooting conditions.

However, the flare color component reduction processing of the present embodiment can be executed even if the pattern and the colored distribution of the color flare are not known, so that there is no problem if shooting condition data is not attached to the input image.

Step S12: The CPU 14 performs size reduction processing on the input image read on the memory 15. Hereinafter, the size-reduced input image is referred to as a "reduced image". Note that the reason why the size reduction processing is performed on the input image is to reduce a calculation load in the following steps S13 to S19 and S23.

Figure 28:
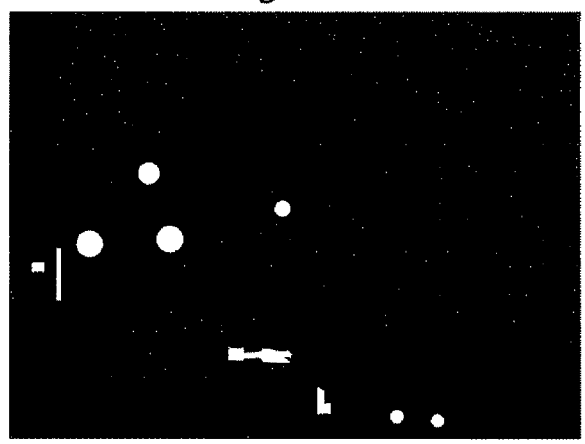
FIG. 28 is an example of detected high luminance areas.

Step S13: The CPU 14 compares a luminance of each pixel in the reduced image with a predetermined value (which is set as a saturation level, in this case) to detect, from the reduced image, a bright area (high luminance area) whose luminance exceeds the predetermined value (refer to FIG. 28). As illustrated in FIG. 28, not only a high luminance area formed due to a flare but also a high luminance area formed irrelevant to the flare may also be mixed in the detected high luminance areas.

Note that in the present step, in order to reduce the calculation load, a sum of respective color components (a sum of R, G, and B) of each pixel may be used instead of using a luminance value (a weighted sum of R, G, and B) of each pixel, as an index of luminance of each pixel. Alternatively, it is also possible to use a value of color component representing each pixel (G intensity), as an index of luminance of each pixel. Further, the method of reducing the calculation load as described above can also be applied to another step handling the luminances of pixels.

Figure 29:
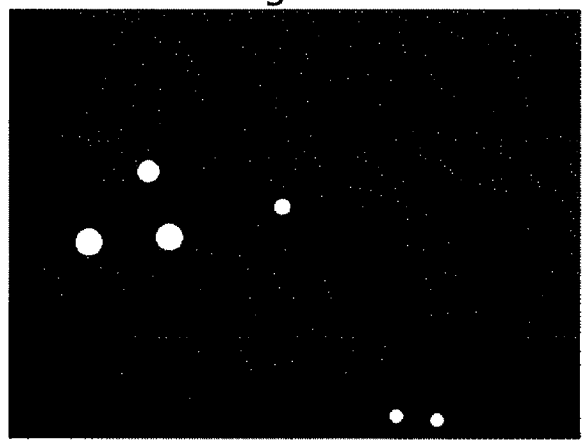
FIG. 29 is an example of high luminance areas (saturation areas) formed due to flares.

Step S14: The CPU 14 discriminates whether or not each of the high luminance areas detected in step S13 is formed due to the flare, and excludes areas except those formed due to the flares (refer to FIG. 29).

Note that the discrimination whether or not the individual high luminance areas are formed due to the flare is conducted in a manner as described below, for example. Specifically, the CPU 14 compares the high luminance area and a previously prepared circular pattern, in which when a correlation between the both is equal to or greater than a certain level, the high luminance area is regarded to be formed due to the flare, and when the correlation is less than the certain level, the high luminance area is regarded to be formed irrelevant to the flare. Note that as the circular pattern to be a comparison target, an average one as the high luminance area formed due to the flare may be used.

Alternatively, the discrimination whether or not the individual high luminance areas are formed due to the flare can also be conducted in a manner as described below. Specifically, the CPU 14 sets a circular area having a predetermined radius from a center of the high luminance area, in which when the high luminance area exists in the entire circular area, the high luminance area is regarded to be formed due to the flare, and when at least a part of the circular area is out of the high luminance area, the high luminance area is regarded to be formed irrelevant to the flare. Note that the radius of the circular area is set to be a radius which is nearly equal to a radius of the smallest high luminance area formed due to the flare.

Therefore, the high luminance area which is not excluded in the present step corresponds to a saturation area in a center part of the flare. Hereinafter, the high luminance area that is not excluded in the present step is simply referred to as a "saturation area".

Figure 30:
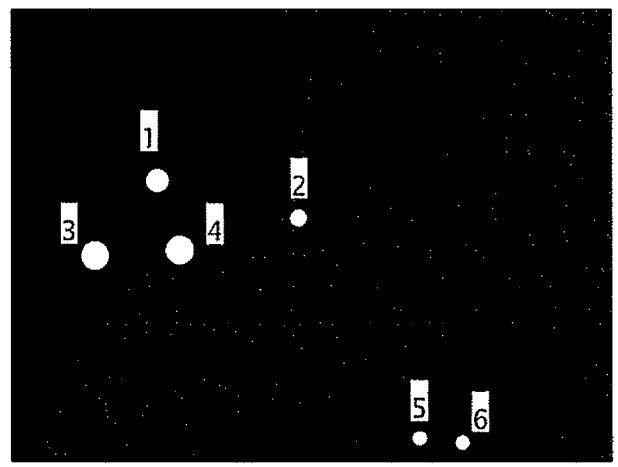
FIG. 30 is an example of labeled saturation areas.

Step S15: The CPU 14 performs labeling on one or a plurality of saturation areas detected in step S14, and gives serial numbers (flare numbers i=1, 2, . . . ) to the areas (refer to FIG. 30). Accordingly, the total number of flares occurred in the input image (namely, a final value of the flare number i) is decided.

Step S16: The CPU 14 sets the flare number i to an initial value (1).

Figure 31:
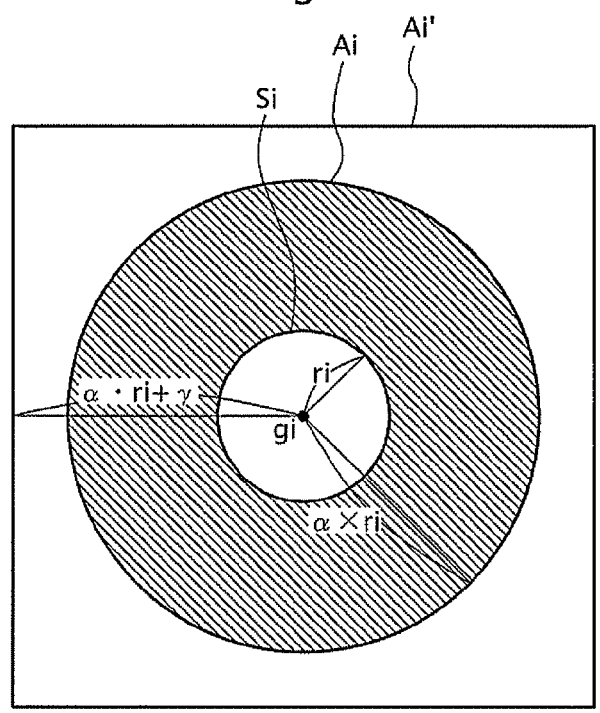
FIG. 31 is a view explaining a relation among a saturation area $S_i$, a flare area $A_i$ and a processing area $A_i'$.

Step S17: As illustrated in FIG. 31, the CPU 14 focuses attention on a saturation area $S_i$ corresponding to the flare number i on the reduced image, and calculates coordinates $g_i$ corresponding to a luminance barycenter of the saturation area $S_i$ to calculate an average distance from the coordinates $g_i$ to a contour of the saturation area $S_i$ as a radius $r_i$ of the saturation area $S_i$. Further, the CPU 14 sets, on the reduced image, a circular area having the coordinates $g_i$ as its center and having a radius ($\alpha \times r_i$), as a flare area $A_i$ corresponding to the flare number i (note that $\alpha > 1$).

Here, if it is assumed that a flare occurred in the flare area $A_i$ is a color flare, a flare color component is conceivable to be superimposed on an area indicated by an oblique line portion in FIG. 31.

Further, the CPU 14 sets, on the reduced image, an inclusion area including the entire flare area $A_i$ and having a certain margin $\gamma$ as a processing area $A_i'$ corresponding to the flare number i (note that $\gamma > 0$).

Note that although a size of the processing area $A_i'$ is set for each of the flare numbers i in this case, it is also possible that the size of the processing area $A_i'$ is set to be common among all of the flare numbers i, as long as the processing area $A_i'$ can include the flare area $A_i$. Further, a shape of the processing area $A_i'$ may be a circular shape or a rectangular shape. Further, there is no problem that a center of the processing area $A_i'$ is out of a center of the flare area $A_i$. Further, in this case, the luminance barycenter of the saturation area $S_i$ is set as the coordinates $g_i$, but, it is also possible to set a center of the saturation area $S_i$ as the coordinates $g_i$, in order to reduce the calculation load.

Step S18: The CPU 14 focuses attention on the flare area $A_i$ corresponding to the flare number i, and discriminates whether or not the flare occurred in the flare area $A_i$ is the color flare, in which when the flare is the color flare, the process proceeds to step S19 to execute color corrected component extraction processing and flare color component extraction processing regarding the processing area $A_i'$, and when the flare is not the color flare, the process proceeds to step S26 to omit the color corrected component extraction processing and the flare color component extraction processing regarding the processing area $A_i'$.

Here, the discrimination whether or not the flare occurred in the flare area $A_i$ is the color flare is conducted in a manner as described below, for example. Specifically, the CPU 14 calculates average values of the flare area $A_i$ for each of color components (for each of R, G, and B), in which when a variation among the color components of those average values exceeds a predetermined range, the flare of the flare area $A_i$ is regarded as the color flare, and when the variation does not exceed the range, it is regarded that the flare is not the color flare (the flare is an achromatic flare).

Step S19: The CPU 14 gives an instruction to the color corrected component extraction processing section 22 to perform the color corrected component extraction processing on the processing area $A_i'$ corresponding to the flare number i. The color corrected component extraction processing section 22 executes the color corrected component extraction processing, and estimates a color corrected component generated due to color correction (saturation enhancement processing, color balance adjusting, color transformation processing or the like) previously performed on the processing area $A_i'$. Note that the color corrected component estimated in the present step is formed of a color corrected component of one color or two colors. Details of the present step will be described later.

Step S20: The CPU 14 subtracts the color corrected component (color corrected component of one color or two colors) estimated in step S19 from the processing area $A_i'$. Accordingly, a color of the processing area $A_i'$ is restored to a state where the color correction is not yet performed.

Step S21: The CPU 14 performs size enlargement processing on the color corrected component (color corrected component of one color or two colors) estimated in step S19. Note that when the size of the input image is reduced by 1/M times in the size reduction processing in the aforementioned step S12, the size of the color corrected component (color corrected component of one color or two colors) is enlarged by M times in the size enlargement processing in the present step. Accordingly, a color corrected component (color corrected component of one color or two colors) having a size corresponding to that of the input image is obtained in the present step.

Step S22: The CPU 14 subtracts the color corrected component (color corrected component of one color or two colors) after performing the size enlargement processing, from an area corresponding to the processing area $A_i'$ on the input image. Note that when performing the subtraction, the CPU 14 determines, based on the coordinates $g_i$ on the reduced image and the aforementioned magnification M, coordinates $g_i'$ on the input image corresponding to the coordinates $g_i$, and makes a center of the color corrected component (color corrected component of one color or two colors) match the coordinates $g_i'$. Accordingly, a color of the area corresponding to the processing area $A_i'$ on the input image is restored to a state where the color correction is not yet performed.

Step S23: The CPU 14 gives an instruction to the flare color component extraction processing section 21 to perform the flare color component extraction processing on the processing area $A_i'$ (restored processing area $A_i'$) corresponding to the flare number i. The flare color component extraction processing section 21 executes the flare color component extraction processing, and estimates a flare color component of a color flare occurred in the processing area $A_i'$. Note that the flare color component estimated in the present step is formed of a flare color component of two colors. Details of the present step will be described later.

Step S24: The CPU 14 performs size enlargement processing on the flare color component (flare color component of two colors) estimated in step S23. Note that when the size of the input image is reduced by 1/M times in the size reduction processing in the aforementioned step S12, the size of the flare color component (flare color component of two colors) is enlarged by M times in the size enlargement processing in the present step. Accordingly, a flare color component (flare color component of two colors) having a size corresponding to that of the input image is obtained in the present step.

Step S25: The CPU 14 subtracts the flare color component (flare color component of two colors) after performing the size enlargement processing, from an area corresponding to the processing area $A_i'$ on the input image (restored input image). Note that when performing the subtraction, the CPU 14 determines, based on the coordinates $g_i$ on the reduced image and the aforementioned magnification M, coordinates $g_i'$ on the input image corresponding to the coordinates $g_i$, and makes a center of the flare color component (flare color component of two colors) match the coordinates $g_i'$. Accordingly, a flare color component of the color flare occurred in the area corresponding to the processing area $A_i'$ on the input image is reduced. Namely, the color flare occurred in the area becomes an achromatic flare.

Step S26: The CPU 14 discriminates whether or not the flare number i reaches the final value, in which when the number does not reach the final value, the process proceeds to step S27, and when the number reaches the final value, the process proceeds to step S28.

Step S27: The CPU 14 increments the flare number i, and the process proceeds to step S17. Therefore, the color corrected components and the flare color components of all of the flare numbers are sequentially reduced from the input image.

Step S28: The CPU 14 displays the input image in which the color corrected components and the flare color components are reduced (referred to as a "final image", hereinafter), on the monitor 19. Thereafter, when a saving instruction is input by the user, the final image is saved in a saving destination specified by the user (for example, a storage medium inserted into the data reading section 12), and the flow is terminated.

Figure 25:
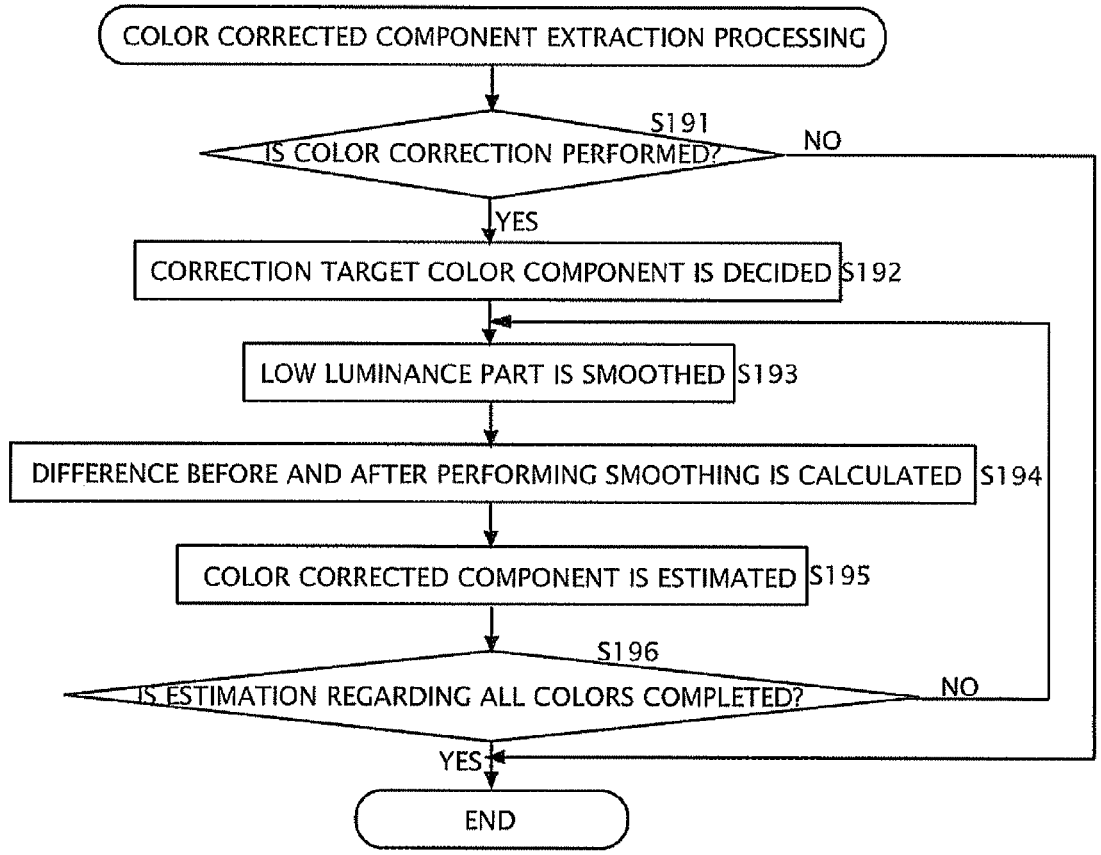
FIG. 25 is a flow chart of color corrected component extraction processing performed by a color corrected component extraction processing section 22.

FIG. 25 is a flow chart of the color corrected component extraction processing performed by the color corrected component extraction processing section 22. Hereinafter, respective steps will be described in order.

Step S191: The color corrected component extraction processing section 22 refers to respective color components (an R component, a G component, and a B component) in the flare area $A_i$ corresponding to the flare number i, and discriminates whether or not there exists a color corrected pixel in the flare area $A_i$, in which when there exists at least one color corrected pixel, the process proceeds to step S192 to execute the color corrected component extraction processing, and when there exists no color corrected pixel, the flow of the color corrected component extraction processing is terminated.

Here, the color corrected pixel corresponds to a pixel having an unnatural color as a pixel in the flare area $A_i$ before performing the color correction. Hereinafter, description will be made by assuming a case where the saturation enhancement is performed as the color correction.

Figure 32A:
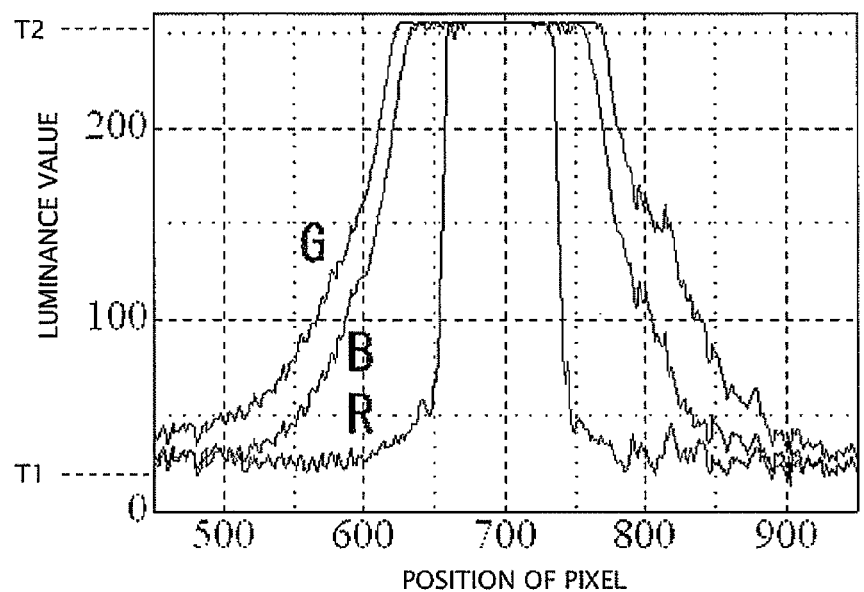
FIGS. 32A and 32B are views for comparing a pixel profile of a certain processing area $A_i'$ before performing saturation enhancement and a pixel profile of the same processing area $A_i'$ after performing the saturation enhancement.
Figure 32B:
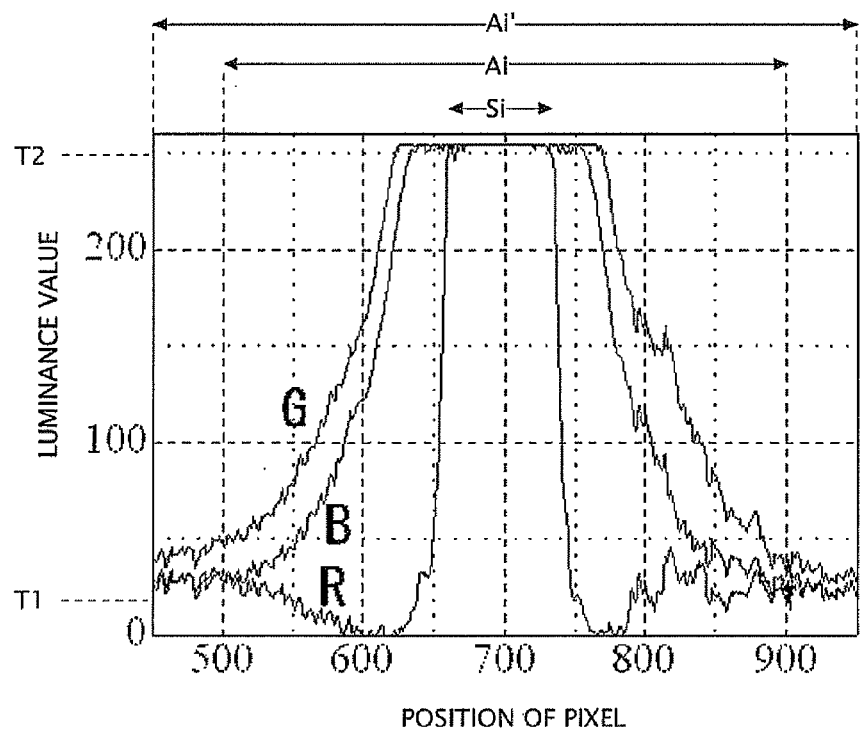

FIG. 32A is a pixel profile (pixel profile on a center line) of a certain processing area $A_i'$ before performing the saturation enhancement, and FIG. 32B is a pixel profile of the same processing area $A_i'$ after performing the saturation enhancement. The saturation enhancement performed on the processing area $A_i'$ is saturation enhancement for relatively enhancing the G component and the B component with respect to the R component.

As illustrated in FIG. 32A, there exist only pixels in which all of the color components are equal to or greater than a noise level T1 in the processing area $A_i'$ before performing the saturation enhancement, but, in the processing area $A_i'$ after performing the saturation enhancement, there are generated pixels whose R components are less than the noise level T1, as illustrated in FIG. 32B. Besides, at least one of the G component and the B component of at least a part of such pixels reaches a saturation level T2. As above, a pixel such as one having at least one color component that reaches the saturation level T2 and having at least one of the other color components that is less than the noise level T1, corresponds to the color corrected pixel.

Incidentally, as illustrated in FIG. 32B, a place where the color corrected pixel is generated is an area inside the flare area $A_i$ and outside the saturation area $S_i$, and this area corresponds to an area on which the flare color component is superimposed. This is because, since the G components and the B components of a lot of pixels in this area already reach the saturation level T2 at a point in time before the saturation enhancement is performed, it is required, in the saturation enhancement, to lower the values of the R components to be equal to or less than the noise level T1, in order to relatively enhance the G components and the R components of such pixels. The color corrected pixel as described above is generated only because the color flare is occurred in the processing area $A_i'$.

Note that there is a possibility that the flare color component cannot be correctly estimated even if later-described flare color component extraction processing is performed on the processing area $A_i'$ that still includes the color corrected pixel, so that there is a need to previously extract and reduce the color corrected component in the present embodiment.

Step S192: The color corrected component extraction processing section 22 detects all of the color corrected pixels from the flare area $A_i$, counts the number of pixels which become less than the noise level T1 from the color corrected pixels for each of the color components (for each of R, G, and B), finds out one or two color components whose calculated number is equal to or more than a certain number (which is set to equal to or more than zero, in this case), and sets the one or two color components as a correction target color component. Note that in an example illustrated in FIG. 32, only the R component is set as the correction target color component. Hereinafter, it is assumed that the correction target color component is only the R component.

Step S193: As illustrated on a left side of FIG. 33A, the color corrected component extraction processing section 22 focuses attention on the R component in the processing area $A_i'$, and performs smoothing only on an area, in the R component, whose value is lower than that of a peripheral area, thereby forming a reference image $I_R''$ such as illustrated in FIG. 33B. This reference image $I_R''$ is used as a reference for calculating the color corrected component. Here, the formation of reference image $I_R''$ can be realized through steps illustrated from FIG. 33A to FIG. 33B.

Specifically, the color corrected component extraction processing section 22 first performs spatial smoothing on the R component $I_R$ illustrated on the left side of FIG. 33A using a smoothing filter such as a Gaussian filter, thereby obtaining an R component $I_R'$ such as illustrated on a right side of FIG. 33A. According to the smoothing, a pixel value of an area in which the value is lower than that of a peripheral area (portion surrounded by a dotted line frame) becomes higher than that before performing the smoothing, and a pixel value of an area in which the value is higher than that of a peripheral area becomes lower than that before performing the smoothing. Subsequently, the color corrected component extraction processing section 22 compares, for each pixel, the two R components $I_R$ and $I_R'$ before and after performing the smoothing, collects pixels with higher values to form one piece of synthetic image, and sets the synthetic image as the reference image $I_R''$ (FIG. 33B). This reference image $I_R''$ corresponds to an image in which only the area, in the original R component $I_R$, whose value is lower than that of the peripheral area (portion surrounded by the dotted line frame) is smoothed.

Figure 34A:
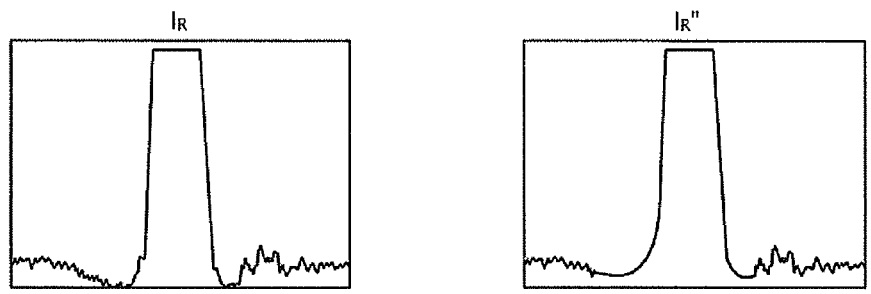
FIGS. 34A, 34B, and 34C are schematic diagrams explaining steps of extracting a color corrected component.
Figure 34B:
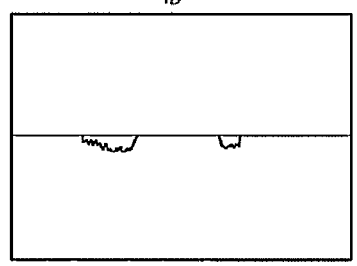

Step S194: As illustrated in FIG. 34A, the color corrected component extraction processing section 22 subtracts the reference image $I_R''$ from the original R component $I_R$, to thereby calculate a color corrected component $I_D$ such as illustrated in FIG. 34B. Note that in the color corrected component $I_D$ calculated here, there remains a high frequency error.

Figure 34C:
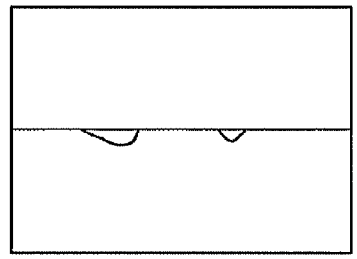

Step S195: The color corrected component extraction processing section 22 performs spatial smoothing on the color corrected component $I_D$ using a smoothing filter such as a Gaussian filter, thereby calculating a color corrected component $I_C$ such as illustrated in FIG. 34C. This color corrected component $I_C$ is a color corrected component regarding the R component.

Step S196: The color corrected component extraction processing section 22 discriminates whether or not the estimation of the color corrected component $I_C$ is completed with respect to all of the correction target color components, in which when the estimation is not completed, the process goes back to step S193 to perform estimation regarding the remaining correction target color component, and when the estimation is completed, the flow in FIG. 25 is terminated (the above is the description of step S196).

Figure 26:
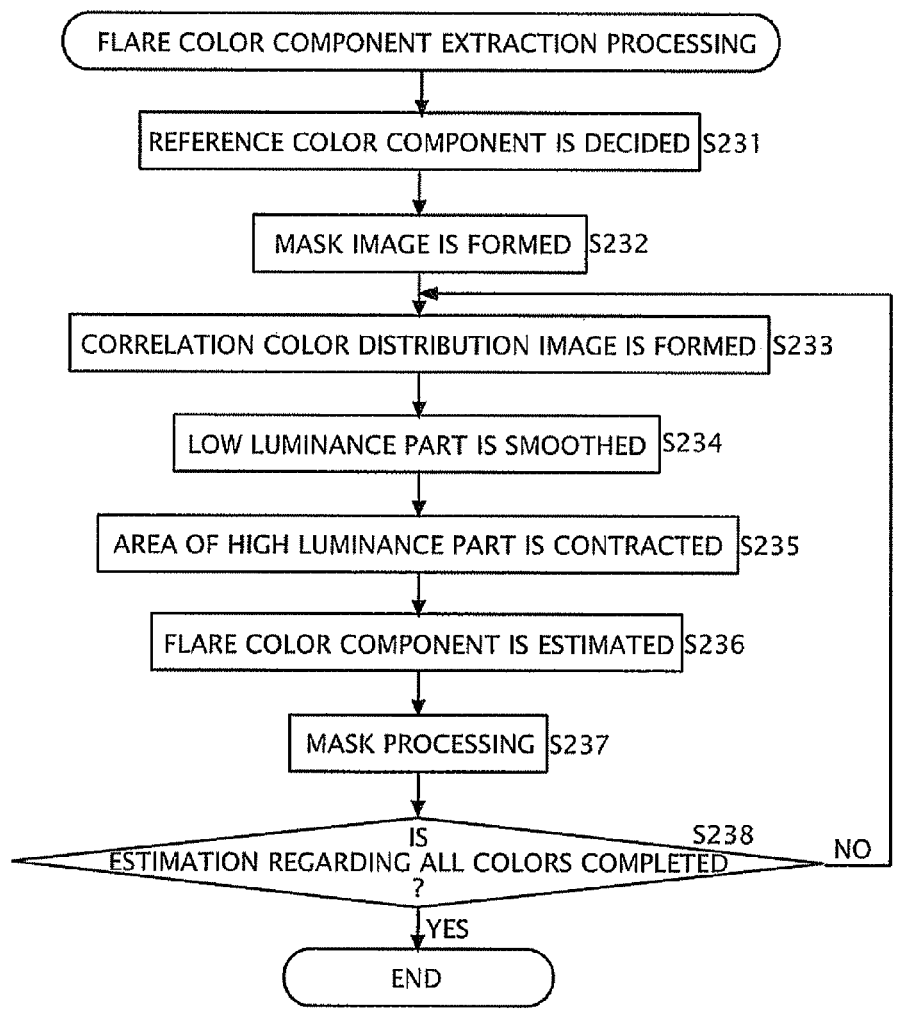
FIG. 26 is a flow chart of flare extraction processing performed by a flare color component extraction processing section 21.

FIG. 26 is a flow chart of the flare extraction processing performed by the flare color component extraction processing section 21. Hereinafter, respective steps will be described in order.

Step S231: The flare color component extraction processing section 21 calculates, for each of the color components (for each of R, G, and B), average values of the restored flare area $A_i$ corresponding to the flare number i, and sets one color component having the smallest average value as a reference color component. Hereinafter, the G component is assumed to be set as the reference color component. In that case, the estimation of the flare color component is performed with respect to each of the color components other than the G component, namely, each of the R component and the B component.

Figure 35:
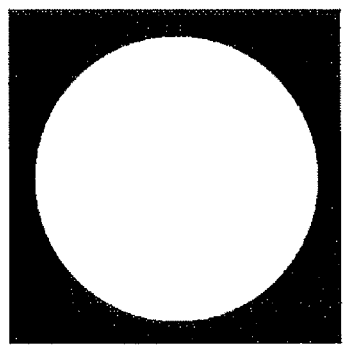
FIG. 35 is a view explaining a binary mask image.
Figure 36:
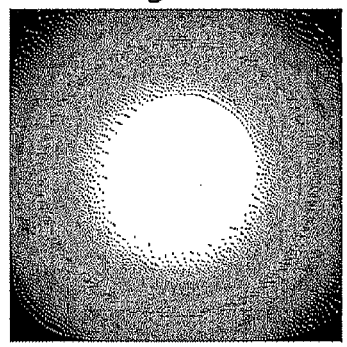
FIG. 36 is a view explaining a gray-scale mask image.

Step S232: The flare color component extraction processing section 21 forms a mask image corresponding to the flare number i. As illustrated in FIG. 35, the mask image is a mask image having the same shape and size as those of the processing area $A_i'$, and is a binary mask image having an opening part provided in an area corresponding to the flare area $A_i$. Further, the flare color component extraction processing section 21 performs spatial smoothing on the mask image using a smoothing filter such as a Gaussian filter, to thereby form a gray-scale mask image such as illustrated in FIG. 36. The gray-scale mask image corresponds to the binary mask image whose contrast of boundary between the opening part and a non-opening part is intentionally lowered. An average value per unit area of the gray-scale mask image decreases from a center toward a periphery of the processing area $A_i'$.

Note that a size (filter diameter) of the smoothing filter used in the present step is desirably set to be larger as the size of the flare area $A_i$ is larger.

Figure 37:
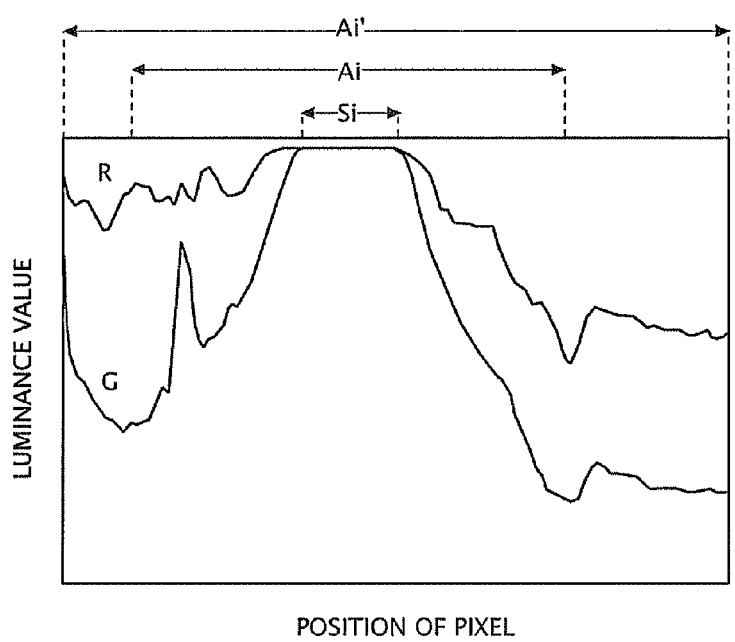
FIG. 37 is a view illustrating a relation between an R component (including a flare color component) and a G component in a processing area $A_i'$.

Step S233: The flare color component extraction processing section 21 sets one color component other than the reference color component (G component, in this case), as a focused color component. Hereinafter, an R component is assumed to be set as the focused color component. FIG. 37 is a diagram (pixel profile) indicating a relation between an R component in a certain processing area $A_i'$ and a G component in the same processing area $A_i'$. As illustrated in FIG. 37, regarding the R component, a flare color component is superimposed on an area inside a flare area $A_i$ and outside a saturation area $S_i$. Specifically, the R component in the area takes a significantly high value, compared to a value of the G component in the same area.

The flare color component extraction processing section 21 in the present step divides the R component in the processing area $A_i'$ by the G component in the processing area $A_i'$, for each pixel, thereby forming a correlation color distribution image $I_{GR}$ of the R component using the G component as a reference. What is illustrated on a left side of FIG. 38A is a schematic diagram of the correlation color distribution image $I_{GR}$.

Here, a lot of pixels in a central area a of the correlation color distribution image $I_{GR}$ have pixel values close to 1, a lot of pixels in a ring-shaped area b positioned in a periphery of the central area a have pixel values higher than 1, and a lot of pixels in a most peripheral area c positioned on an outside of the ring-shaped area b have pixel values lower than those in the ring-shaped area b. Among the above, the central area a corresponds to the saturation area $S_i$ illustrated in FIG. 37, the ring-shaped area b corresponds to an area inside the flare area $A_i$ and outside the saturation area $S_i$ illustrated in FIG. 37, namely, an area on which the flare color component is superimposed.

Step S234: The flare color component extraction processing section 21 performs smoothing only on areas, in the correlation color distribution image $I_{GR}$, whose value is lower than that of a peripheral area (the central area a and the most peripheral area c), thereby obtaining a correlation color distribution image $I_{GR}''$ such as illustrated in FIG. 38B. Note that the obtainment of correlation color distribution image $I_{GR}''$ can be realized through steps illustrated from FIG. 38A to FIG. 38B.

Specifically, the flare color component extraction processing section 21 first performs spatial smoothing on the entire correlation color distribution image $I_{GR}$ illustrated on the left side of FIG. 38A using a smoothing filter such as a Gaussian filter, thereby obtaining a correlation color distribution image $I_{GR}'$ such as illustrated on a right side of FIG. 38A. According to the smoothing, a value of an area in which the value is lower than that of a peripheral area becomes higher than that before performing the smoothing, and a value of an area in which the value is higher than that of a peripheral area becomes lower than that before performing the smoothing. Subsequently, the flare color component extraction processing section 21 compares, for each pixel, the two correlation color distribution images $I_{GR}$ and $I_{GR}'$ before and after performing the smoothing, collects pixels with higher values to form one piece of synthetic image, and sets the synthetic image as the correlation color distribution image $I_{GR}''$ (FIG. 38B). This correlation color distribution image $I_{GR}''$ corresponds to the original correlation color distribution image $I_{GR}$ in which only the area on which no flare color component is superimposed (portion surrounded by a dotted line frame) is smoothed.

Step S235: The flare color component extraction processing section 21 performs contraction processing on the correlation color distribution image $I_{GR}''$ using a minimum value filter or the like to contract an area of the area whose value is higher than that of the peripheral area in the correlation color distribution image $I_{GR}''$, thereby obtaining a correlation color distribution image $I_H$ such as illustrated in FIG. 38C. Further, by performing spatial smoothing on the correlation color distribution image $I_H$ using a smoothing filter such as a Gaussian filter, the flare color component extraction processing section 21 obtains a correlation color distribution image $I_H'$ such as illustrated in FIG. 38D. The correlation color distribution image $I_H'$ corresponds to the original correlation color distribution image $I_{GR}$ in which the area on which the flare color component is superimposed is interpolated by the peripheral area (portion surrounded by the dotted line frame).

Step S236: The flare color component extraction processing section 21 multiplies, for each pixel, the reference color component (G component, in this case) in the processing area $A_i'$ by the correlation color distribution image $I_H'$, thereby calculating an R component $I_{Rnew}$ as a result of reducing the flare color component. Accordingly, the flare color component regarding the R component is reduced from the processing area $A_i'$. Note that FIG. 39 is a pixel profile of the processing area $A_i'$ after performing the reduction.

Figure 39:
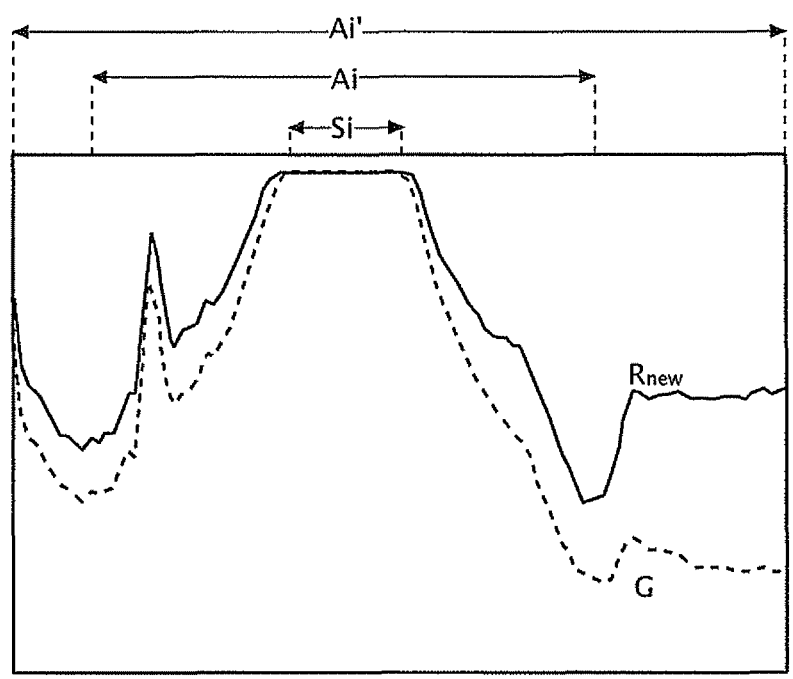
FIG. 39 is a view illustrating a relation between an R component (including no flare color component) and the G component in the processing area $A_i'$.

As is apparent from the comparison of FIG. 39 with FIG. 37, it can be understood that after performing the reduction, an R intensity in the area on which the flare color component is superimposed (area inside the flare area $A_i$ and outside the saturation area $S_i$) is approximated to a G intensity in the same area. Further, it can be understood that after performing the reduction, an R/G intensity in the area on which the flare color component is superimposed is interpolated by an R/G intensity in an area outside the flare area $A_i$ and an R/G intensity inside the saturation area $S_i$. Further, it can be understood that after performing the reduction, a shape of an R intensity distribution in the area on which the flare color component is superimposed turns into a shape corresponding to a shape of a G intensity distribution in the same area.

Note that the flare color component extraction processing section 21 in the present step previously calculates a flare color component $I_{FR}$ regarding the R component by subtracting the R component $I_{Rnew}$ as a result of reducing the flare color component, from the original R component (it previously converts the R component $I_{Rnew}$ as a result of reducing the flare color component into the flare color component $I_{FR}$). This is because there is a need to perform, before calculating a final image, several processing (mask processing, size enlargement processing and the like) on the flare color component $I_{FR}$ in the present embodiment.

Step S237: The flare color component extraction processing section 21 applies the gray-scale mask formed in step S232 to the flare color component $I_{FR}$ obtained in step S236, to thereby blur a peripheral part of the flare color component $I_{FR}$. This is conducted because, if the peripheral part is previously blurred as above, it is possible to prevent an unnatural gradation difference from occurring on the processing area $A_i'$ when the flare color component $I_{FR}$ is reduced (subtracted) from the R component in the processing area $A_i'$. Further, as described above, since the size of the smoothing filter used for the formation of gray-scale mask is set to the size corresponding to the size of the flare area $A_i$, the peripheral part of the flare color component $I_{FR}$ after the mask is applied becomes more natural. Accordingly, the estimation of the flare color component $I_{FR}$ regarding the R component is completed.

Step S238: The flare color component extraction processing section 21 discriminates whether or not the estimation regarding all of the color components other than the reference color component (the R component and the B component, in this case) is completed, in which when the estimation is not completed, the process proceeds to step S233 to perform estimation of the color component which is not yet estimated, and when the estimation is completed, the flow is terminated. Note that although only the estimation regarding the R component is described here, since the estimation regarding the B component is the same as the estimation regarding the R component, description thereof is omitted (the above is the description of step S238).

As described above, in the present embodiment, the estimation of the flare color component superimposed on the flare area $A_i$ is performed based on the color distribution of the flare area $A_i$, and in advance of the estimation, it is discriminated whether or not the color correction is performed on the flare area $A_i$, in which when the color correction is performed, the color distribution of the flare area $A_i$ is restored to a state where the color correction is not yet performed, so that it is possible to reduce the possibility of failing to estimate the flare color component.

Incidentally, when the restoration of the color distribution is not performed before estimating the flare color component, the flare color component is erroneously estimated, resulting in that an unnatural black ring-shaped noise is generated on the final image.

Further, in the restoration of the color distribution in the present embodiment, the processing area $A_i'$ including the flare area $A_i$ is set, smoothing is performed on the area, in the correction target color component in the processing area $A_i'$, whose value is lower than that of the peripheral area, and the color corrected component regarding the correction target color component is estimated based on the difference between the correction target color components before and after performing the smoothing (refer to FIG. 33 and FIG. 34), which enables to perform the correct restoration.

Further, in the estimation of the flare color component in the present embodiment, the processing area $A_i'$ including the flare area $A_i$ is set, and at the same time, the reference color component to be a reference among the respective color components in the flare area $A_i$ is specified, and based on the correlation between the reference color component and the focused color component in the processing area $A_i'$ and the reference color component in the flare area $A_i$, the flare color component included in the flare area $A_i$ is estimated. Specifically, in the present embodiment, the flare color component (=colored distribution of color flare) is extracted, instead of extracting the flare component itself. When the flare color component is used, it is possible to turn the color flare into the achromatic flare, so that an unnaturalness peculiar to the color flare can be securely eliminated.

Figure 38:
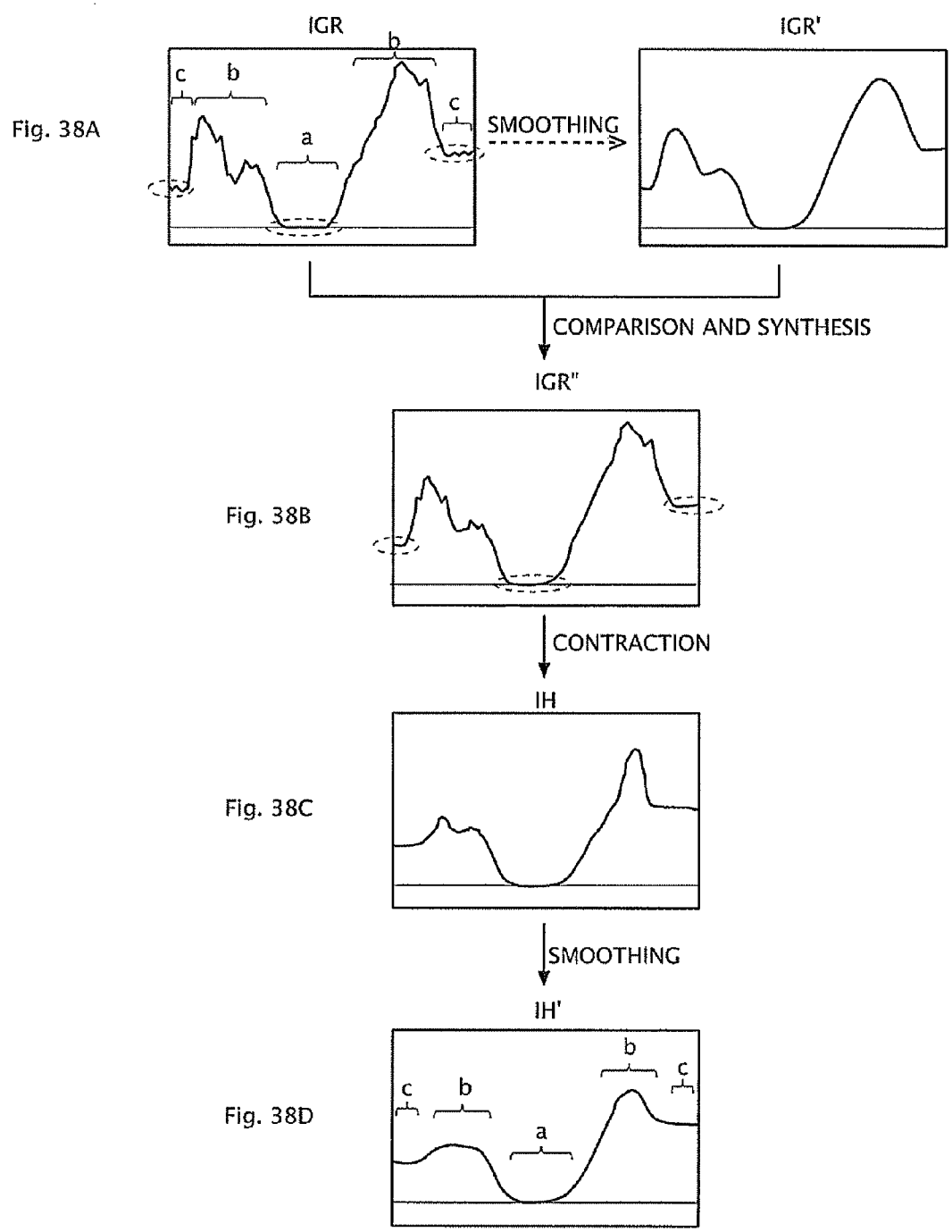
FIGS. 38A, 38B, 38C, and 38D are schematic diagrams explaining steps of extracting the flare color component.

Further, in the estimation of the flare color component in the present embodiment, the correlation color distribution of the processing area $A_i'$ is calculated, smoothing is performed on the area, in the correlation color distribution, whose value is lower than that of the peripheral area, contraction is performed on the area of the area, in the correlation color distribution after performing the smoothing, whose value is higher than that of the peripheral area, and multiplying the reference color component in the processing area $A_i'$ by the correlation color distribution after performing the contraction, thereby calculating a non-flare color component in the processing area $A_i'$ (refer to FIG. 38 and FIG. 39). Accordingly, in the present embodiment, it is possible to substantially correctly estimate the non-flare color component.

Further, in the present embodiment, the non-flare color component is subtracted from the processing area $A_i'$ to calculate the flare color component included in the processing area $A_i'$, the mask having the opening part of the same shape as the flare area $A_i$ is applied to the flare color component, and then the flare color component is subtracted from the processing area $A_i'$. Further, in the present embodiment, the gray-scale mask (FIG. 36) in which the values of the contour portion of the opening part are smoothed, is used as the mask. Accordingly, in the present embodiment, it is possible to prevent an unnatural gradation difference from occurring on the final image.

Further, in the estimation of the color corrected component and the estimation of the flare color component in the present embodiment, the size reduced version of the input image is used instead of using the input image, so that the calculation load can be reduced.

Modified Example of Third Embodiment

Note that although the color corrected component extraction processing section 22 in the third embodiment forms the reference image $I_R''$ in steps S193 to S195, the formation of reference image $I_R''$ can also be omitted. In that case, the color corrected component extraction processing section 22 is only required to execute the following steps S193' to S195', instead of steps S193 to S195. Note that also in this case, it is assumed that the correction target color component is the R component.

Step S193': The color corrected component extraction processing section 22 refers to the R component inside the flare area $A_i$ and outside the saturation area $S_i$, calculates a maximum value of the R component, and sets the value as a reference value T. This reference value T is used as a reference for calculating the color corrected component.

Figure 40:
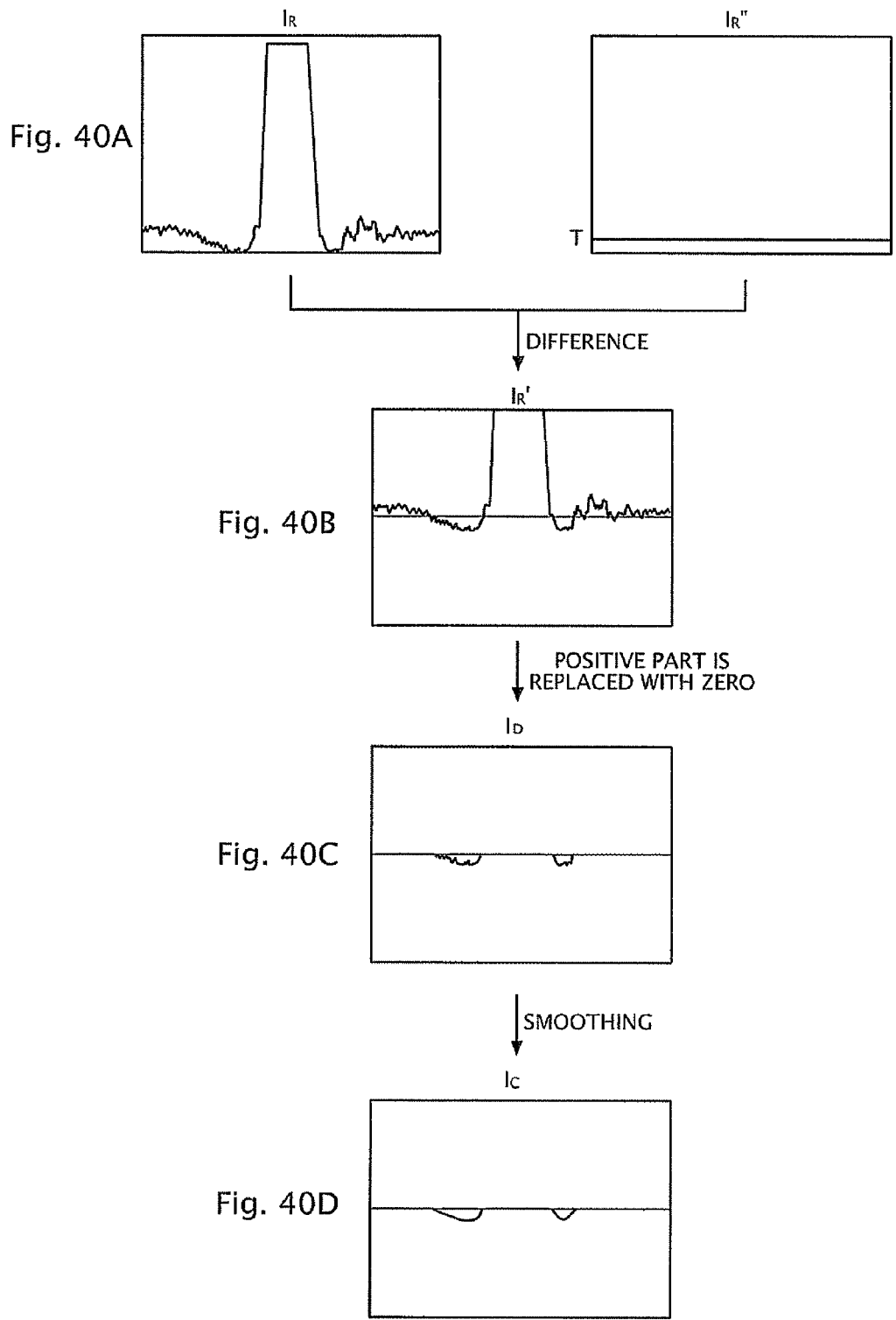
FIGS. 40A, 40B, 40C, and 40D are schematic diagrams explaining a modified example of the steps of extracting the color corrected component.

Step S194': The color corrected component extraction processing section 22 subtracts the reference value T from the R component $I_R$ in the processing area $A_i'$ as illustrated in FIG. 40A, to thereby calculate an offset R component $I_R'$ such as illustrated in FIG. 40B. Further, by replacing a value of pixel having a positive value in the offset R component $I_R'$ with zero, the color corrected component extraction processing section 22 obtains a color corrected component $I_D$ such as illustrated in FIG. 40C. Note that in the color corrected component $I_D$ calculated here, there remains a high frequency error.

Step S195': The color corrected component extraction processing section 22 performs spatial smoothing on the color corrected component $I_D$ using a smoothing filter such as a Gaussian filter, thereby calculating a color corrected component $I_C$ such as illustrated in FIG. 40D. This color corrected component $I_C$ is a color corrected component regarding the R component (the above is the description of step S195').

Further, the color corrected component extraction processing section 22 in the third embodiment automatically discriminates, based on the flare area $A_i$, whether or not the color correction is performed on the flare area $A_i$, but, when the input image is a RAW image (image before performing development processing), there is no possibility that the color correction is performed, so that there is no problem to instantly discriminate that the color correction is not performed, without based on the flare area $A_i$.

Further, even if the input image is not the RAW image, when a parameter representing contents of the color correction is added to the input image, the color corrected component extraction processing section 22 can also calculate the color corrected component based not on the flare area $A_i$ but on the parameter.

Further, although the flare color component extraction processing section 21 in the third embodiment performs the estimation of the flare color component with respect to each of the two color components other than the reference color component, it is also possible to omit the estimation regarding one color component out of the two color components. If the G component is assumed to be the reference color component, it is also possible to omit the estimation regarding the B component when a difference between the average value of the G component and the average value of the B component in the flare area $A_i$ falls within a predetermined range, namely, when there is no difference between the G component and the B component, for example.

Further, the flare color component extraction processing section 21 in the third embodiment automatically sets the reference color component, but, it is also possible to allow the user to specify the component.

Further, in the aforementioned flare color component reduction processing, in order to reduce the calculation load in steps S13 to S19, and S23, a size reduced version of the input image (reduced image) is used instead of using the input image as it is, but, if it is desired to give priority to the enhancement in accuracy over the reduction in the calculation load, it is also possible to use the input image as it is. Note that in that case, the processing in steps S21, S22, and S24 are omitted.

Further, in the aforementioned flare color component reduction processing, although the occurrence position of flare in the input image is automatically detected by the CPU 14, it is also possible to allow the user to specify the position.

Further, in the aforementioned flare color component reduction processing, although the flare area $A_i$ is automatically detected by the CPU 14, it is also possible to allow the user to specify the area.

Further, in the aforementioned flare color component reduction processing, although the processing area $A_i'$ is automatically set by the CPU 14, it is also possible to allow the user to set the area.

Further, in the aforementioned flare color component reduction processing, although the CPU 14 automatically discriminates whether or not the flare occurred in the flare area $A_i$ is the color flare, it is also possible to allow the user to perform the discrimination.

Further, the flare color component extraction processing section 21 in the present embodiment estimates the flare color component in the flare area $A_i$ based on the correlation between the reference color component and the focused color component in the processing area $A_i$ and the reference color component in the flare area $A_i$, but, there is no problem if the estimation is conducted using another method based on the color distribution of the flare area $A_i$.

Fourth Embodiment

Hereinafter, a fourth embodiment of the present application will be described.

Figure 41:
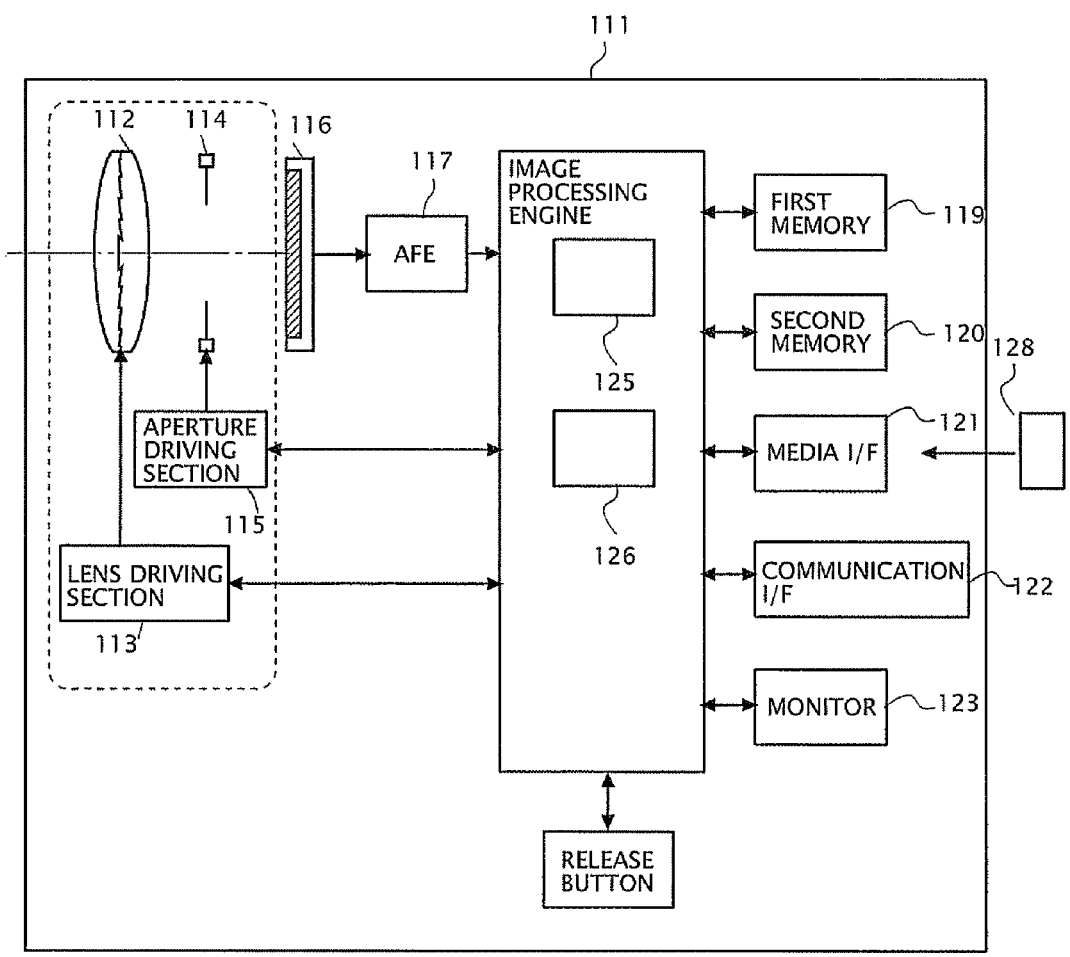
FIG. 41 is a block diagram illustrating a configuration example of an electronic camera of a fourth embodiment.

FIG. 41 is a block diagram illustrating a schematic configuration of an electronic camera. As illustrated in FIG. 41, an electronic camera 111 includes a shooting optical system 112, a lens driving section 113, an aperture 114, an aperture driving section 115, a color imaging device 116, an AFE 117, an image processing engine 118, a first memory 119, a second memory 120, a media I/F 121, a communication I/F 122, a monitor 123, and a release button 124, and among the above, the lens driving section 113, the aperture driving section 115, the AFE 117, the first memory 119, the second memory 120, the media I/F 121, the communication I/F 122, the monitor 123, and the release button 124 are respectively connected to the image processing engine 118. Further, the shooting optical system 112 is a high-functional shooting optical system including a DOE lens, for example.

The first memory 119 is formed of a volatile storage medium (an SDRAM or the like), and temporarily stores a captured image in a pre-process or post-process of image processing performed by the image processing engine 118. Meanwhile, the second memory 120 is formed of a nonvolatile storage medium such as a flash memory, and stores a program executed by the image processing engine 118 over a long period of time.

The first memory 119 stores an image processing program to be executed by the image processing engine 118, and the image processing program includes a function of flare color component reduction processing which is the same as that of the third embodiment. When the flare color component reduction processing is carried out, the image processing engine 118 functions as a flare color component extraction processing section 125 and a color corrected component extraction processing section 126. The flare color component extraction processing section 125 and the color corrected component extraction processing section 126 operate in the same manner as the flare color component extraction processing section 21 in the third embodiment.

Accordingly, the image processing engine 118 of the present embodiment can perform the flare color component reduction processing which is the same as that of the third embodiment, on an image obtained by the electronic camera 111 through shooting and an image read via the media I/F 121 (or the communication I/F 122).

Note that since the flare color component reduction processing of the present embodiment does not need shooting condition data, there is no problem that a part indicated by a dotted line in FIG. 41 is exchangeable with respect to the electronic camera 111. Further, it is needless to say that, since the flare color component reduction processing of the present embodiment does not need the shooting condition data, the image processing engine 118 does not have to read imaging characteristic data of the shooting optical system 112.

Further, the flare color component reduction processing of the present embodiment can also be modified in the same manner as that of the third embodiment.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing method, comprising:
   an input step inputting a color processing target image obtained through a shooting optical system;
   a detecting step detecting a high luminance area included in the color processing target image;
   a first discriminating step discriminating whether or not the detected high luminance area is an occurrence area of a color flare;
   a second discriminating step discriminating whether or not a color correction is performed on the occurrence area by comparing a value of a color component of a pixel included in the occurrence area with a preset threshold;
   a restoring step restoring a color distribution of the occurrence area after the color correction to a color distribution of the occurrence area before the color correction;
   a flare estimating step estimating an influence of the color flare in the occurrence area based on the color distribution of the restored occurrence area; and
   a reducing step reducing the estimated influence of the color flare from the restored occurrence area.

2. The image processing method according to claim 1, wherein the color correction is saturation enhancement.

3. The image processing method according to claim 2, wherein
   in the second discriminating step, when at least one color corrected pixel having a first color component which is less than a noise level and a second color component which is equal to or greater than a saturation level exists in the occurrence area, it is regarded that there is a possibility of the color correction being performed on the occurrence area.

4. The image processing method according to claim 3, wherein the restoring step comprises:
   an area setting step setting a processing area including the occurrence area on the processing target image;
   a smoothing step smoothing an area having a lower value compared to a value of a peripheral area in a focused color component of the processing area; and
   a corrected component calculating step calculating a color corrected component in the focused color component based on a difference between the focused color component before and after being smoothed.

5. The image processing method according to claim 1, wherein
   the flare estimating step comprises:
   an area setting step setting a processing area including the occurrence area on the processing target image;
   a reference color setting step setting a reference color component to be a reference among respective color components of the occurrence area;
   a correlation calculating step calculating correlation information indicating a correlation between a reference color component and another color component in the processing area; and
   a flare color component estimating step estimating a flare color component being a colored distribution of the color flare based on the correlation information of the processing area and the reference color component of the occurrence area.

6. The image processing method according to claim 1, wherein
   in the restoring step and the flare estimating step, a size reduced version of the processing target image is used instead of using the processing target image.

7. A non-transitory computer-readable storage medium storing an image processing program to cause a computer to execute:
   an input step inputting a color processing target image obtained through a shooting optical system;
   a detecting step detecting a high luminance area included in the color processing target image;
   a first discriminating step discriminating whether or not the detected high luminance area is an occurrence area of a color flare;
   a second discriminating step discriminating whether or not a color correction is performed on the occurrence area by comparing a value of a color component of a pixel included in the occurrence area with a preset threshold;
   a restoring step restoring a color distribution of the occurrence area after the color correction to a color distribution of the occurrence area before the color correction;
   a flare estimating step estimating an influence of the color flare in the occurrence area based on the color distribution of the restored occurrence area; and
   a reducing step reducing the estimated influence of the color flare from the restored occurrence area.

8. An image processing apparatus, comprising:
   an input unit inputting a color processing target image obtained through a shooting optical system;
   a detecting unit detecting a high luminance area included in the color processing target image;

a first discriminating unit discriminating whether or not the detected high luminance area is an occurrence area of a color flare;

a second discriminating unit discriminating whether or not a color correction is performed on the occurrence area by comparing a value of a color component of a pixel included in the occurrence area with a preset threshold;

a restoring unit restoring a color distribution of the occurrence area after the color correction to a color distribution of the occurrence area before the color correction;

a flare estimating unit estimating an influence of the color flare in the occurrence area based on the color distribution of the restored occurrence area; and a reducing unit reducing the estimated influence of the color flare from the restored occurrence area.

9. An imaging apparatus, comprising:

an imaging device capturing an object image formed by a shooting optical system; and the image processing apparatus according to claim 8.

10. The imaging apparatus according to claim 9, further comprising a shooting lens including a diffractive optical element.

11. The imaging apparatus according to claim 9, wherein a shooting lens including a diffractive optical element can be attached to the imaging apparatus.

* * * * *